United States Patent
Zhu et al.

(10) Patent No.: US 10,243,182 B2
(45) Date of Patent: *Mar. 26, 2019

(54) POWER BATTERY MODULE WITH DETACHABLE SEPARATORS

(71) Applicant: BYD COMPANY LIMITED, Guangdong (CN)

(72) Inventors: Yan Zhu, Guangdong (CN); Qingbo Peng, Guangdong (CN); Jia Lu, Guangdong (CN); Xuefeng Zhang, Guangdong (CN); Wei Liu, Guangdong (CN); Yan Huang, Guangdong (CN); Zhipei Lu, Guangdong (CN); Jianhua Zhu, Guangdong (CN)

(73) Assignee: BYD Company Limited, Shenzhen, Guangdong (CN)

( * ) Notice: Subject to any disclaimer, the term of this patent is extended or adjusted under 35 U.S.C. 154(b) by 319 days.

This patent is subject to a terminal disclaimer.

(21) Appl. No.: 15/188,492

(22) Filed: Jun. 21, 2016

(65) Prior Publication Data

US 2016/0301049 A1   Oct. 13, 2016

Related U.S. Application Data

(63) Continuation of application No. PCT/CN2014/095427, filed on Dec. 29, 2014.

(30) Foreign Application Priority Data

Dec. 31, 2013   (CN) .......................... 2013 1 0753873

(51) Int. Cl.
*H01M 2/10*   (2006.01)
*H01M 10/42*  (2006.01)
(Continued)

(52) U.S. Cl.
CPC ......... *H01M 2/1077* (2013.01); *H01M 2/202* (2013.01); *H01M 2/206* (2013.01);
(Continued)

(58) Field of Classification Search
CPC ........... H01M 2/1077; H01M 10/6557; H01M 2/202; H01M 10/425; H01M 10/482;
(Continued)

(56) References Cited

U.S. PATENT DOCUMENTS 4,074,017 A * 2/1978 Kinsey .................... H01M 2/20
429/1
2006/0267545 A1* 11/2006 Lee ...................... H01M 2/1061
320/106

(Continued)

FOREIGN PATENT DOCUMENTS

CN   101944580 A   1/2011
CN   202839812 U   3/2013
(Continued)

OTHER PUBLICATIONS

International Search Report and Written Opinion for PCT/CN2014/095427 dated Mar. 25, 2015, 10 pages.

*Primary Examiner* — Imran Akram
(74) *Attorney, Agent, or Firm* — Sheppard Mullin Richter & Hampton LLP

(57) ABSTRACT

A power battery module includes a battery accommodating assembly having a plurality of separators, the separator comprising: a separator body; a left cover; and a right cover, in which adjacent separators are detachably connected with each other; a battery group; a power connection member, a line snap-fit, a power connection line and a signal collection assembly.

20 Claims, 19 Drawing Sheets

(51) Int. Cl.
  *H01M 10/48* (2006.01)
  *H01M 2/20* (2006.01)

(52) U.S. Cl.
  CPC ......... *H01M 10/425* (2013.01); *H01M 10/48* (2013.01); *H01M 10/482* (2013.01); *H01M 2010/4271* (2013.01); *H01M 2010/4278* (2013.01); *H01M 2220/20* (2013.01)

(58) Field of Classification Search
  CPC ........ H01M 2/1016; H01M 2/14; H01M 2/20; H01M 2/24; H01M 2/26
  See application file for complete search history.

(56) References Cited

U.S. PATENT DOCUMENTS

| | | | | |
|---|---|---|---|---|
| 2008/0057393 | A1* | 3/2008 | Onuki | H01M 2/1022 429/159 |
| 2010/0310909 | A1 | 12/2010 | Yun et al. | |
| 2011/0076521 | A1* | 3/2011 | Shimizu | H01M 2/1061 429/7 |
| 2011/0104532 | A1* | 5/2011 | Buck | F16K 17/16 429/82 |
| 2011/0256446 | A1 | 10/2011 | Bronczyk et al. | |
| 2012/0156559 | A1* | 6/2012 | Davies | H01M 2/0247 429/210 |
| 2012/0244404 | A1* | 9/2012 | Obasih | B60L 3/0046 429/99 |
| 2013/0122339 | A1* | 5/2013 | Chae | B60L 11/1879 429/99 |
| 2013/0252045 | A1 | 9/2013 | Park et al. | |
| 2013/0260197 | A1 | 10/2013 | Okada et al. | |
| 2013/0273400 | A1* | 10/2013 | Musetti | H01M 2/1077 429/71 |
| 2013/0313953 | A1* | 11/2013 | Lee | H01M 2/1077 312/236 |
| 2014/0120407 | A1* | 5/2014 | Hofer | H01M 2/206 429/159 |
| 2014/0272508 | A1* | 9/2014 | Musetti | H01M 2/1077 429/99 |
| 2015/0357682 | A1* | 12/2015 | Farha | B60L 11/123 429/61 |

FOREIGN PATENT DOCUMENTS

| | | |
|---|---|---|
| EP | 2432044 A1 | 3/2012 |
| JP | 2013-077500 A | 4/2013 |
| WO | 2012/042913 A1 | 4/2012 |
| WO | 2012120091 A1 | 9/2012 |
| WO | 2013/031614 A1 | 3/2013 |
| WO | 2013/084756 A1 | 6/2013 |

* cited by examiner

POWER BATTERY MODULE WITH DETACHABLE SEPARATORS

CROSS REFERENCE TO RELATED APPLICATION

This application is a continuation application of International Application No. PCT/CN2014/095427, filed Dec. 29, 2014, which is based upon and claims priority to Chinese Patent Application No. 201310753873.5, filed with State Intellectual Property Office of China on Dec. 31, 2013. The entire contents of the above-referenced applications are incorporated herein by reference.

FIELD

Embodiments of the present disclosure generally relate to a battery field, and more particularly, to a power battery module.

BACKGROUND

In the related art, most of the power battery modules adopt a battery accommodating assembly with a multi-plate structure or an upper-lower housing structure. Although these structures can protect the battery well, a combination mode of the batteries cannot be expanded and developed freely due to the limitations of the multi-plate structure and the upper-lower housing structure. When the combination mode of the batteries needs to be changed, it is necessary to redesign and redevelop a new combination manner of the batteries, which will waste a lot of time and greatly increase the cost. Also, the battery accommodating assemblies with the multi-plate and upper-lower housing structures are not suitable for an automatic production of the power battery module, thus increasing the cost of the power battery module.

SUMMARY

Embodiments of the present disclosure seek to solve at least one of the problems existing in the related art to at least some extent.

Accordingly, an object of the present disclosure is to provide a power battery module which can freely expand a number of batteries and be adapted to different connection manners of the batteries according to an actual requirement.

Embodiments of a broad aspect of the present disclosure provide a power battery module, which includes: a battery accommodating assembly having a plurality of separators, a battery group, a power connection member, a line snap-fit, a power connection line and a signal collection assembly. The separator includes: a separator body having a front portion defining a front accommodating groove and a rear portion; a left cover disposed at a left end of the separator body; and a right cover disposed at a right end of the separator body. Adjacent separators are detachably connected with each other, the front accommodating groove of one of the adjacent separators and the rear portion of the separator body of the other of the adjacent separators define a battery chamber, and a snapping hole is formed in at least one of upper and lower walls of the front accommodating groove. The battery group includes a plurality of batteries which are accommodated in the battery chambers correspondingly, and each battery has an electrode terminal. The power connection member is connected with the electrode terminals of adjacent batteries. The line snap-fit includes a snap-fit body defining a line groove penetrating the snap-fit body in a length direction of the snap-fit body, and a snap-fitting portion disposed on an exterior of the snap-fit body and having a line clasp configured to be snapped in the snapping hole to fasten the snap-fit body to the separator. The power connection line passes through and is received in the line groove, and is connected with the power connection member. The signal collection assembly includes: a substrate; a signal collection line formed by a sheet-like conductive element disposed on the substrate; a signal collection member disposed on the substrate and connected with the signal collection line; and a signal collection terminal disposed on the substrate and including a first end connected with the signal collection line and a second end connected with the power connection member.

With the adjacent separators defining the battery chamber to accommodate the battery and the plurality of separators connected with one another detachably, the power battery module according to embodiments of the present disclosure can freely expand a number of batteries and be adapted to different connection manners of the batteries (such as a series connection, a parallel connection and a series-parallel connection) according to an actual requirement. Moreover, with the line snap-fit, a line groove is formed in the snap-fit body, the power connection line (lines or wires) may be limited in the line groove effectively and conveniently, the lines or wires may be prevented from shaking in the process of use, a friction between the lines or wires and surrounding structures may be reduced to improve safety performance of the power battery module. Also with the snap-fitting portion including a line clasp and disposed on the snap-fit body, the line snap-fit is detachably connected with the separator, such that the line snap-fit are reusable, and it is easy to assemble and disassemble the line snap-fit, and a maintenance cost and time may also be reduced.

In addition, with the signal collection assembly according to embodiments of the present disclosure, the signal collection line, the signal collection member and signal collection terminal are integrated on the substrate. Thus, the signal collection assembly has a small size, a light weight, a low cost and is easy to manufacture and assemble, such that assembly efficiency may be increased and the signal collection assembly is adapted to the automatic production. Moreover, the signal collection assembly according to embodiments of the present disclosure may have a high reliability; and an insulation failure due to a friction between the lines or wires or a collision to the lines or wires may be effectively avoided; the defect of messy structure of a traditional signal collection member may be eliminated. The signal collection assembly according to embodiments of the present disclosure may have a wide application, for example, different signals due to different service environments may be collected, as long as a corresponding signal collection member and a corresponding signal collection terminal are provided in a circuit, there is no need to redesign the whole signal collection assembly.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
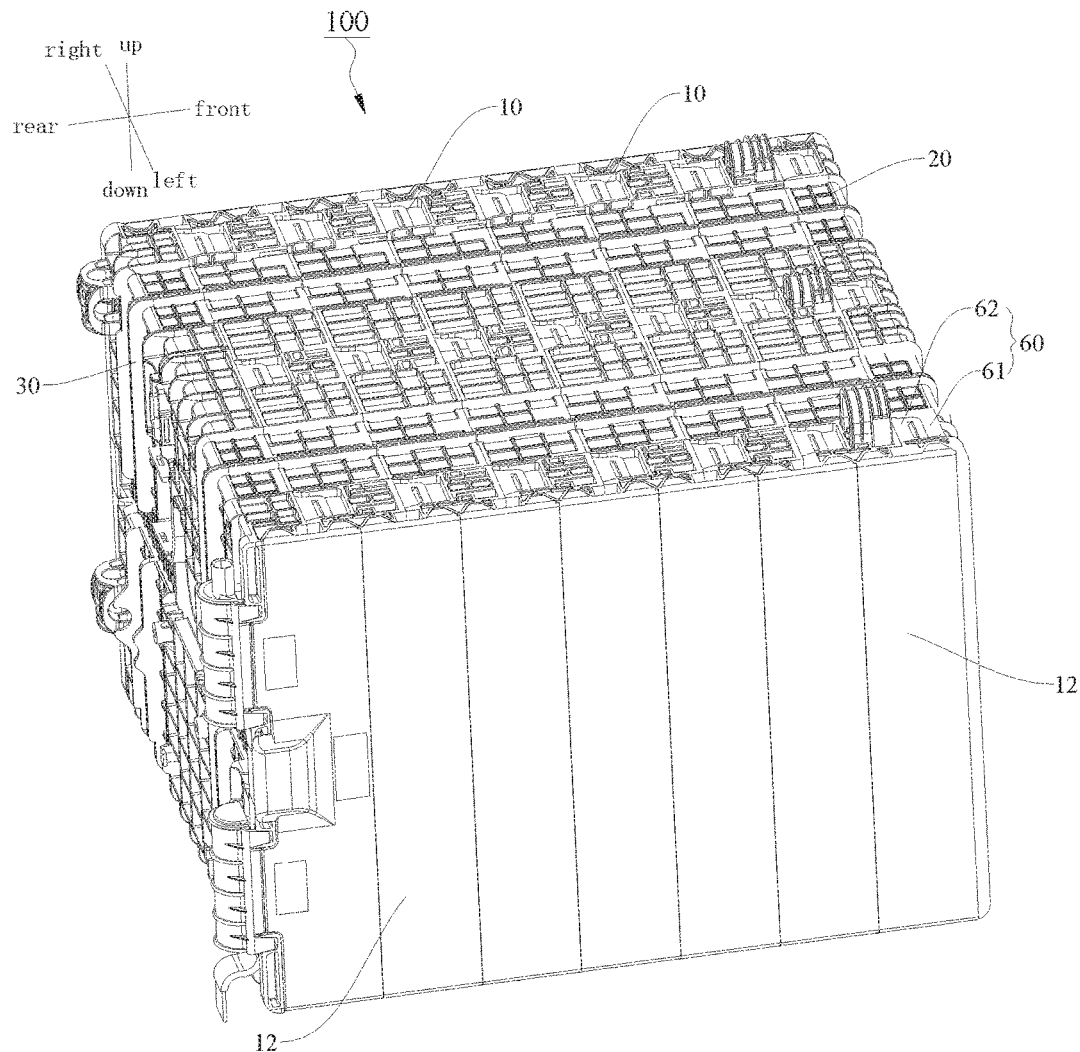
FIG. 1 is a schematic view of an assembled power battery module according to an embodiment of the present disclosure.

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the specification, unless specified or limited otherwise, relative terms such as "central", "longitudinal", "lateral", "front", "rear", "right", "left", "inner", "outer", "lower", "upper", "horizontal", "vertical", "above", "below", "up", "top", "bottom", "inner", "outer", "clockwise", "anticlockwise" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation.

In addition, terms such as "first" and "second" are used herein for purposes of description and are not intended to indicate or imply relative importance or significance. Thus, features limited by "first" and "second" are intended to indicate or imply including one or more than one these features. In the description of the present disclosure, "a plurality of" relates to two or more than two.

In the description of the present disclosure, unless specified or limited otherwise, it should be noted that, terms "mounted," "connected" "coupled" and "fastened" may be understood broadly, such as permanent connection or detachable connection, electronic connection or mechanical connection, direct connection or indirect connection via intermediary, inner communication or interaction between two elements. These having ordinary skills in the art should understand the specific meanings in the present disclosure according to specific situations.

In the description of the present disclosure, a structure in which a first feature is "on" a second feature may include an embodiment in which the first feature directly contacts the second feature, and may also include an embodiment in which an additional feature is formed between the first feature and the second feature so that the first feature does not directly contact the second feature, unless otherwise specified. Furthermore, a first feature "on," "above," or "on top of" a second feature may include an embodiment in which the first feature is right "on," "above," or "on top of" the second feature, and may also include an embodiment in which the first feature is not right "on," "above," or "on top of" the second feature, or just means that the first feature has a sea level elevation larger than the sea level elevation of the second feature. While first feature "beneath," "below," or "on bottom of" a second feature may include an embodiment in which the first feature is right "beneath," "below," or "on bottom of" the second feature, and may also include an embodiment in which the first feature is not right "beneath," "below," or "on bottom of" the second feature, or just means that the first feature has a sea level elevation smaller than the sea level elevation of the second feature.

A power battery module 1000 according to embodiments of the present disclosure will be described in the following with reference to FIGS. 1-22. The power battery module 1000 serves as a power source of an electric vehicle, such that the performance and safety thereof become significant factors for the whole electric vehicle.

As shown in FIGS. 1-22, the power battery module 1000 according to embodiments of the present disclosure includes: a battery accommodating assembly 100, a battery group, a power connection member 430, a power connection line (not shown), a line snap-fit 200 and a signal collection assembly 400. The battery accommodating assembly 100 has a plurality of separators 10, and each of the separators 10 includes a separator body 11, a left cover 12 and a right cover 13. The separator body 11 has a front portion and a rear portion opposed to each other, and a front accommodating groove 14 is formed in the front portion of the separator body 11. Specifically, the front accommodating groove 14 is configured to extend backward from the front portion of the separator body 11. In some embodiments of the present disclosure, the plurality of separators 10 is disposed parallel with each other in a rear-front direction.

A snapping hole 1123 is formed in at least one of upper and lower walls of the front accommodating groove 14. A left cover 12 is disposed at a left end of the separator body 11, and a right cover 13 is disposed at a right end of the separator body 11. Adjacent separators 10 are detachably connected with each other, and the front accommodating groove 14 of one of the adjacent separators 10 and the rear portion of the separator body 11 of the other of the adjacent separators 10 defines a battery chamber.

The battery group includes a plurality of batteries 101 which are accommodated in the battery chambers correspondingly, i.e. one battery 101 is accommodated in one battery chamber, and each of the batteries 101 has an electrode terminal 411. The power connection member 430 is configured to connect electrode terminals 411 of two adjacent batteries 101, and the power connection line is connected with the power connection member 430.

The line snap-fit 200 includes a snap-fit body 210 and a snap-fitting portion 220. The snap-fit body 210 defines a line groove 211, and the power connection line passes through and is received in the line groove 211. The line groove 211 penetrates the snap-fit body 210 in a length direction of the snap-fit body 210, and the snap-fitting portion 220 is disposed on an exterior of the snap-fit body 210 and has a line clasp 221 configured to be snapped in the snapping hole 1123 to fasten the line snap-fit 200 to the separator 10. That is, the snap-fitting portion 220 includes the line clasp 221 configured to fasten the snap-fit body 210 to the separator 10, the line clasp 221 is adapted to be snapped in the snapping hole 1123 to fasten the snap-fit body 210 to the separator 10. Thus, the line snap-fit 200 is detachably disposed on the separator body 11, such that lines or wires may be prevented from shaking, and the structure is stable.

In some embodiments of the present disclosure, the line snap-fit 200 is disposed between the plurality of separators 10, or between the left cover 12 and the separator 10, or between the right cover 13 and the separator 10. Thus, the line snap-fit 200 may have an effect of fastening lines or wires, that is, the power connection line connected with the battery 101 may be limited on the battery accommodating assembly 100 tidily and neatly by means of the line snap-fit 200, thus improving a reliability of the power battery module 1000. In addition, the connection between the separator 10 and the left cover 12 or the right cover 13 may be realized via the line snap-fit 200.

The signal collection assembly 400 includes: a substrate 401, a signal collection line 4021, a signal collection member 402 and a signal collection terminal 403. The signal collection line 4021 is formed by a sheet-like conductive metal element disposed on the substrate 401. The signal collection member 402 is disposed on the substrate 401 and connected with the signal collection line 4021.

The signal collection terminal 403 is disposed on the substrate 401 and has a first end connected with the signal collection line 4021 and a second end connected with the power connection member 430 of the power battery module 1000.

Since the adjacent separators 10 are detachably connected with each other, any number of separators 10 can be connected together according to an actual requirement, such that any number of batteries 101 can be adopted to satisfy requirements of the power battery modules 1000 having different parameters, i.e. the power battery module 1000 can be freely expanded and developed according to the actual requirement. For example, a capability of the battery accommodating assembly 100 to accommodate the battery 101 can be improved by increasing a number of the separators 10. In other words, by increasing the number of the separators 10, a number of the battery chambers in the power battery module 1000 can also be increased, so that more accommodating space can be provided for the additional batteries 101 in the power battery module 1000.

Accordingly, with the adjacent separators 10 defining the battery chamber configured to accommodate the battery 101 and connected with each other detachably, the power battery module 1000 according to embodiments of the present disclosure can freely expand the number of the batteries 101 and be adapted to different connection manners of the batteries (such as a series connection, a parallel connection and a series-parallel connection of the batteries 101) according to an actual requirement. In addition, with the line snap-fit 200, the power connection line (lines or wires) may be limited in the line groove 211 effectively and conveniently, the lines or wires may be prevented from shaking in the process of use, a friction between the lines or wires and surrounding structures may be reduced to improve safety performance of the power battery module 1000. Moreover, with the snap-fitting portion 220 including a line clasp 221 and disposed on the snap-fit body 210, the line snap-fit 200 is detachably connected with the separator 10, such that the line snap-fit 200 are reusable, and it is easy to assemble and disassemble the line snap-fit 200, and a maintenance cost and time may also be reduced.

In addition, with the signal collection assembly 400 of the power battery module 1000 according to embodiments of the present disclosure, the signal collection line 4021, the signal collection member 402 and the signal collection terminal 403 are integrated on the substrate 401, such that the signal collection assembly 400 has a small size, a light weight, a low cost and is easy to manufacture and assemble. Thus, assembly efficiency may be increased and the signal collection assembly is adapted to the automatic production. Moreover, the signal collection assembly 400 according to embodiments of the present disclosure has a high reliability; an insulation failure due to a friction between the lines or wires or a collision to the lines or wires may be effectively avoided; and the defect of messy structure of a traditional signal collection member may be eliminated. The signal collection assembly 400 according to embodiments of the present disclosure may have a wide application, for example, different signals due to different service environments may be collected, as long as a corresponding signal collection member 402 and a corresponding signal collection terminal 403 are provided in a circuit, there is no need to redesign the whole signal collection assembly.

In some embodiments of the present disclosure, a through hole may be formed in at least one of left and right walls of the battery chamber. The through hole serves as an exit for an electrode passing through the battery chamber, and positive and negative electrodes of the battery 101 can extend out via the through hole so as to facilitate a connection between the batteries 101. Alternatively, the through hole may serve as a positioning hole 621 of an anti-explosion valve or an injection hole via which an anti-explosion liquid may be injected into the battery chamber. That is, a function of the through hole can be determined according to the actual requirement so as to facilitate a function development of the power battery module 1000.

Alternatively, two notches opposed to each other may be formed in adjacent separators 10 respectively and the two notches define the through hole. In an embodiment of the present disclosure, a cross-section of the through hole may be a circular, elliptic, polygonal or irregular shape.

Alternatively, a plurality of through holes are arranged and spaced apart from one another in an up-down direction, i.e. a plurality of the notches may be formed in one separator 10 and spaced apart from one another in the up-down direction.

Specifically, the front accommodating groove 14 is configured to extend backward from the front portion of the separator body 11. A front notch 141 is formed in at least one of left and right walls of the front accommodating groove 14, and the front accommodating groove 14 of one of adjacent separators 10 and the rear portion of the separator body 11 of the other of the adjacent separators 10 define the battery chamber. The front notch 141 of one of the adjacent separators 10 and the rear portion of the separator body 11 of the other of the adjacent separators 10 define the through hole. In other words, an accommodating groove of the battery 101 is merely formed in the front portion of each separator 10, and the front accommodating groove 14 of a first separator 10 and the rear portion of a second separator 10 adjacent to the first separator 10 define the battery chamber to accommodate the battery 101. Therefore, the separator 10 has a simpler structure and is easy to manufacture.

In some embodiments, the rear portion of each separator may define a rear accommodating groove, and a rear notch 151 corresponding to the front notch 141 may be formed in at least one of left and right walls of the rear accommodating groove. The battery chamber may be defined by the front accommodating groove 14 of one of the adjacent separators 10 and the rear accommodating groove of the other of the adjacent separators 10, and the through hole may be defined by the front notch 141 of one of the adjacent separators 10 and the rear notch 151 of the other of the adjacent separators 10. Therefore, the battery chamber is defined by the front accommodating groove 14 and the rear accommodating groove to have more space for accommodating the battery 101. Structures of the front and rear portions of each separator 10 may be identical with each other, such that the separator 10 can have a symmetrical structure.

Alternatively, the front notch 141 and the rear notch 151 may be configured to have a semicircular shape, and thus the through hole defined by the front notch 141 and the rear notch 151 can have a circular cross-section. In an embodiment of the present disclosure, each of the separators 10 may have a same structure, such that the plurality of separators 10 can be manufactured by a same set of mold, thus saving the cost and facilitating the assembling and quantity production of the power battery module 1000.

Figure 4:
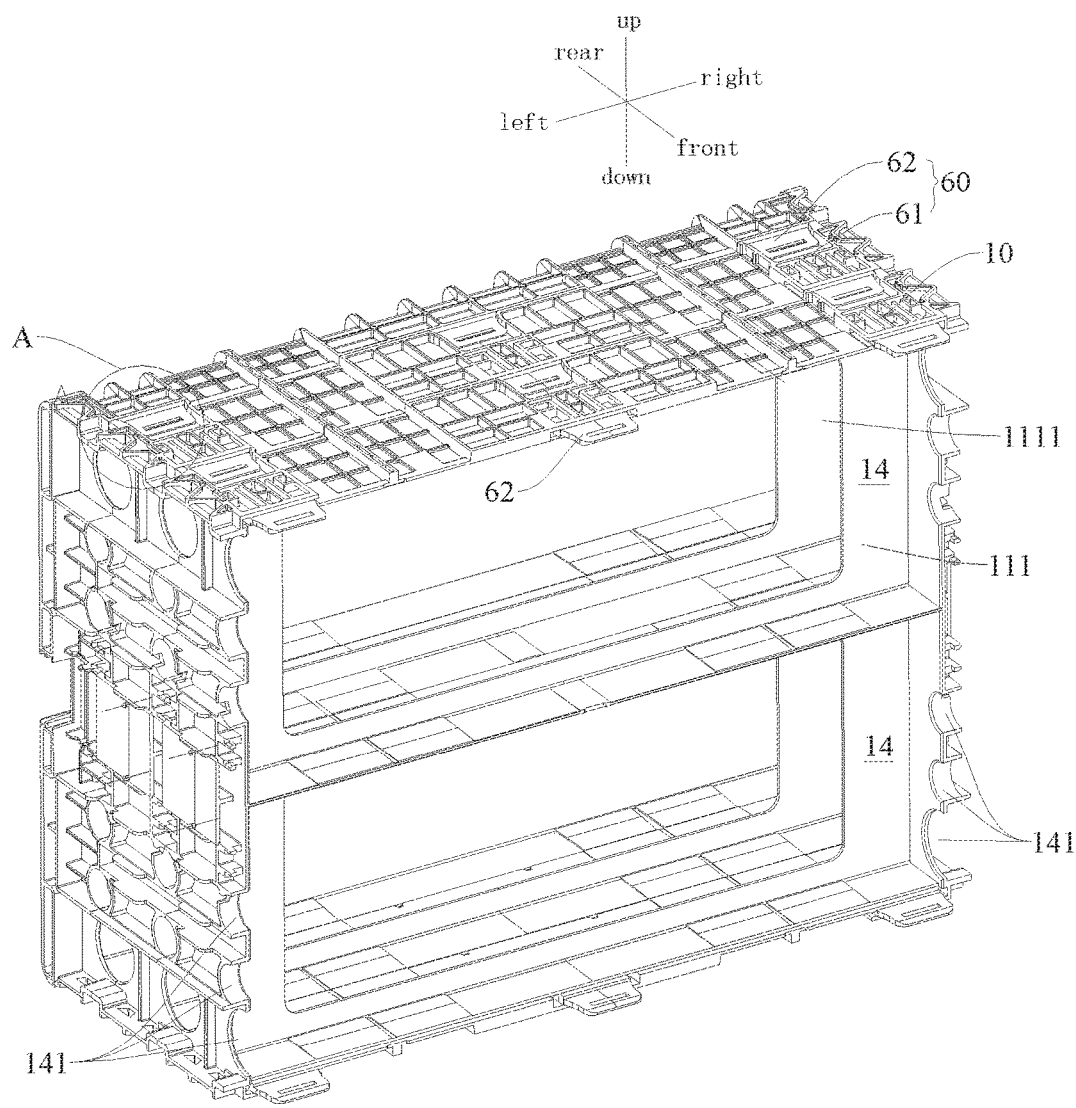
FIG. 4 is a schematic view showing an assembling relationship between separators of the power battery module shown in FIG. 1.
Figure 6:
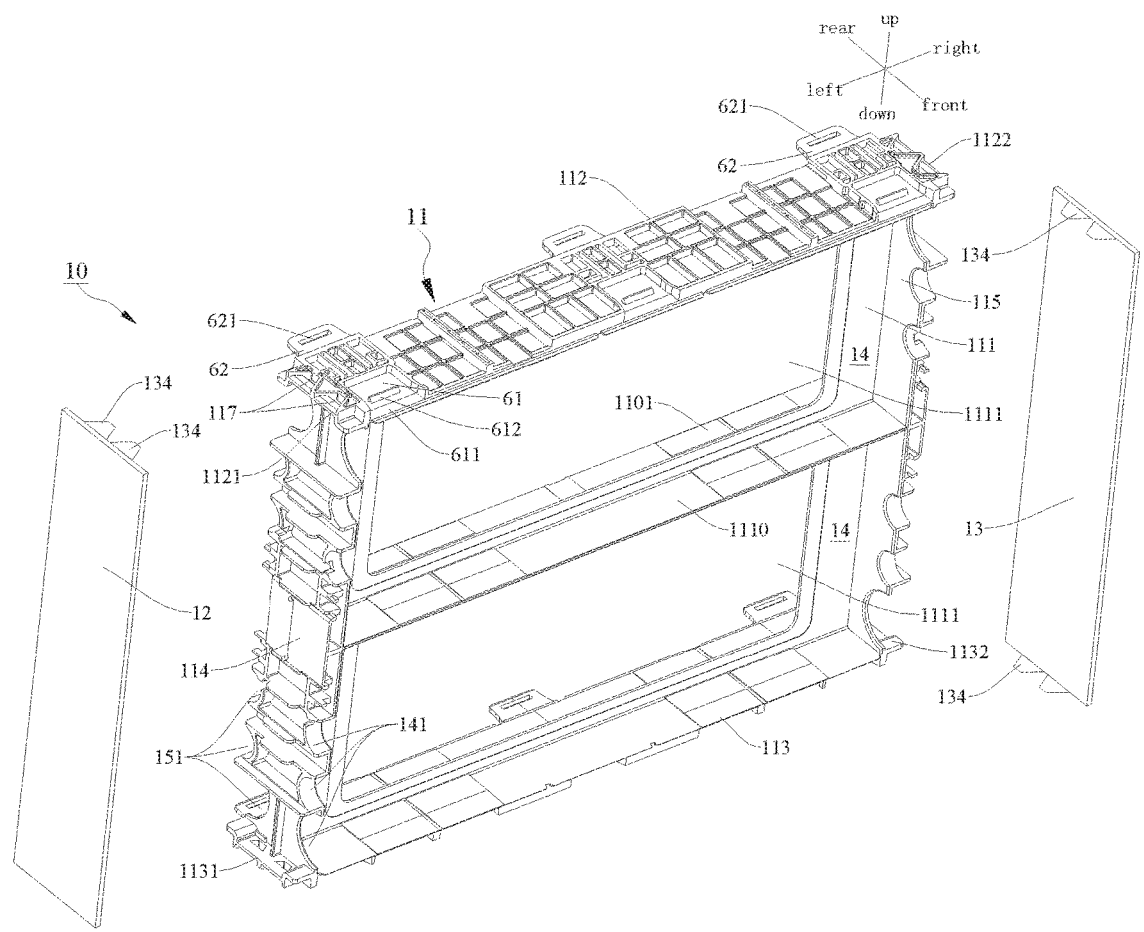
FIG. 6 is a perspective view of a separator of the power battery module shown in FIG. 1.
Figure 7:
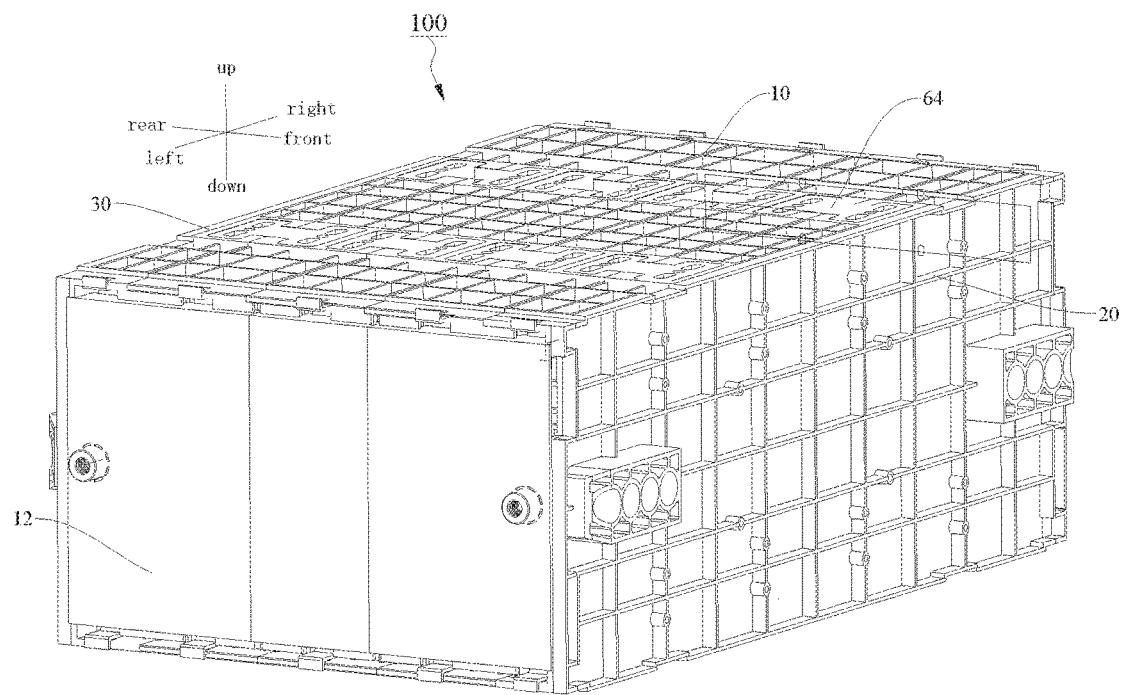
FIG. 7 is a schematic view of a power battery module according to another embodiment of the present disclosure.
Figure 8:
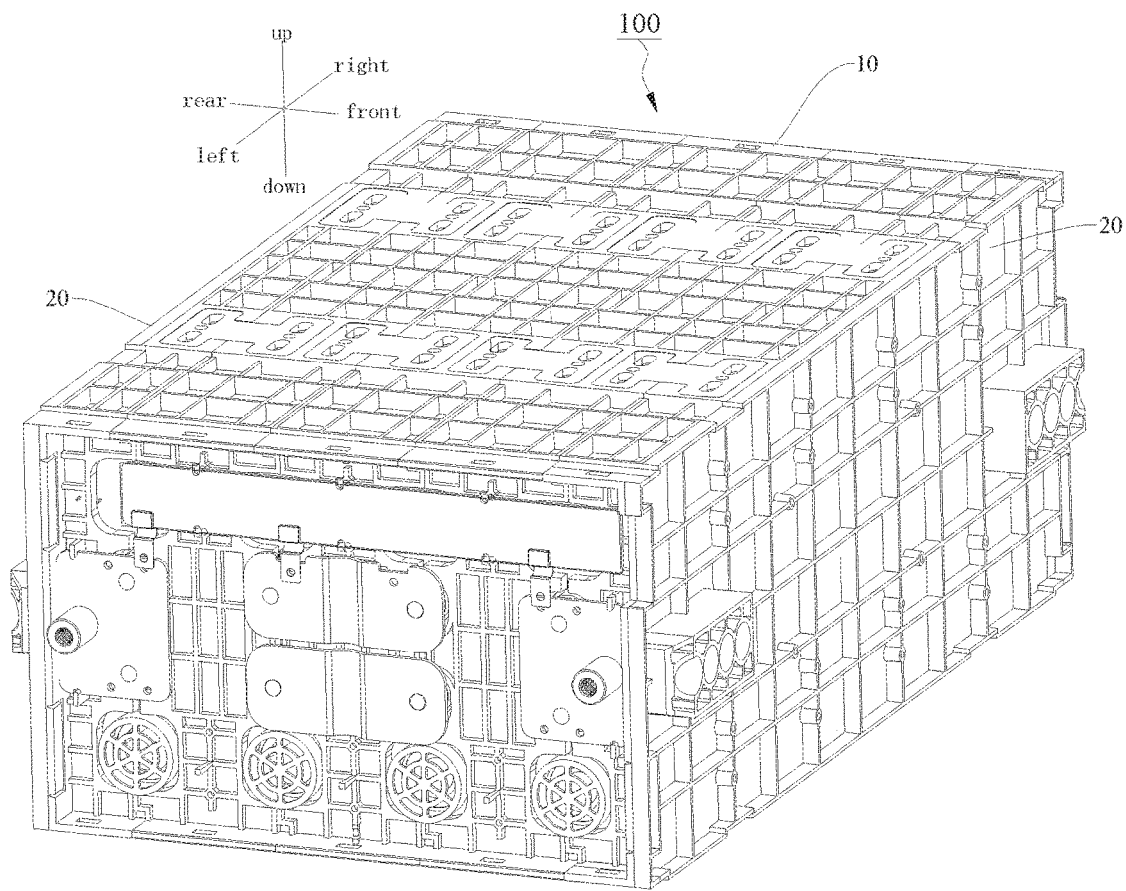
FIG. 8 is a schematic view of the power battery module shown in FIG. 7 without left and right covers.
Figure 9:
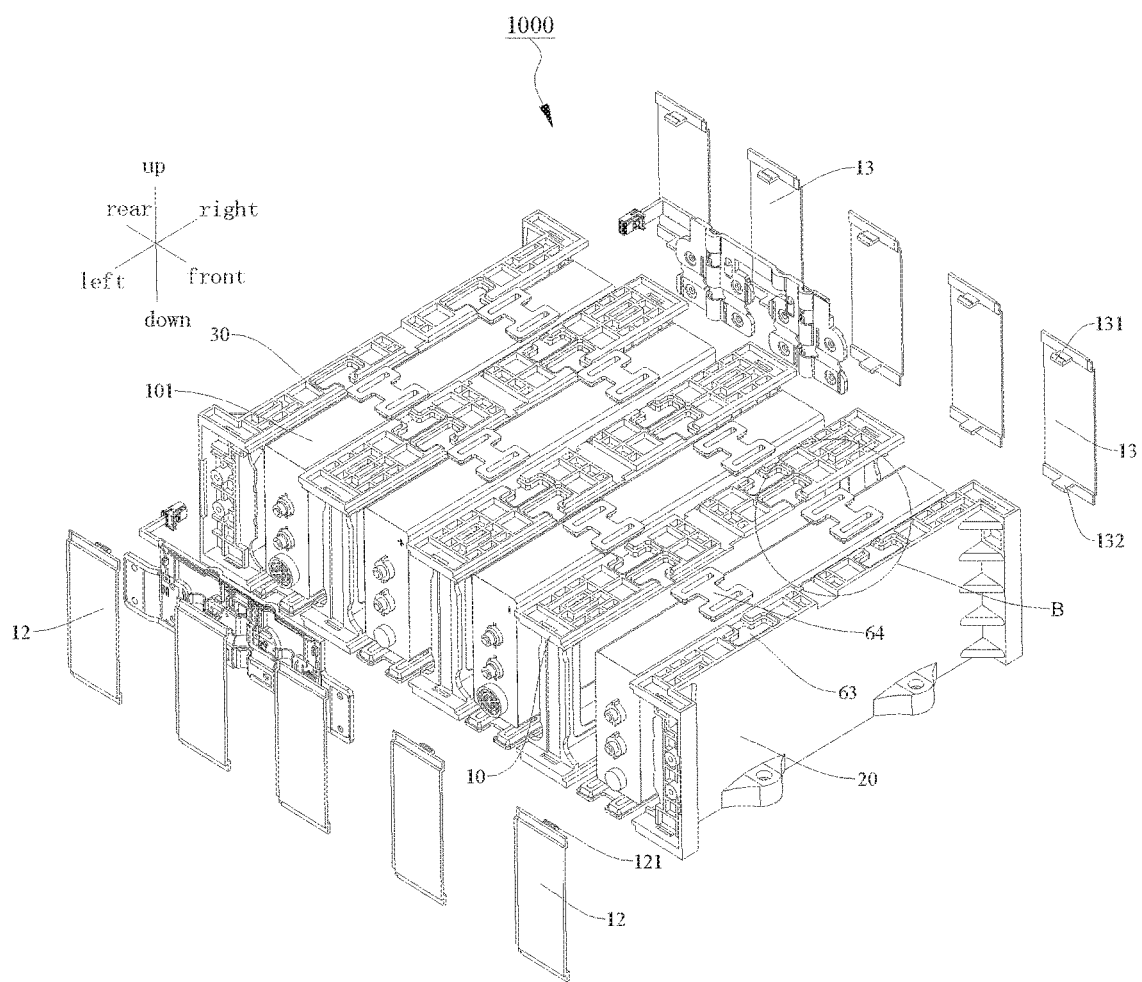
FIG. 9 is a schematic view showing an assembling relationship between a battery accommodating assembly and a battery according to a further embodiment of the present disclosure.

As shown in FIGS. 4 and 6, each of the separators 10 includes two front accommodating grooves 14 arranged in the up-down direction and two rear accommodating grooves arranged in the up-down direction and in one-to-one correspondence to the front accommodating grooves 14. The two front accommodating grooves 14 are separated from each other by a front separating plate 1110, and the two rear accommodating grooves are separated from each other by a rear separating plate 1101. Therefore, two battery chambers are formed between the two separators 10 to accommodate two batteries 101, thus further improving the capability of the battery accommodating assembly 100 to accommodate the battery 101 and ensuring the compact structure of the power battery module 1000. It can be understood by those skilled in the related art that the two battery chambers formed between the two adjacent separators 10 and spaced apart from each other in the up-down direction are just exemplary, and not limited. In other words, more battery chambers such as three or more than three battery chambers may be formed between adjacent separators 10, and thus more batteries 101 can be disposed in the battery accommodating assembly 100, such that the power battery module 1000 is easy to use and has a high expansibility. In an embodiment of the present disclosure, the front separating plate 1110 and rear separating plate 1101 corresponding to each other are formed integrally, thus enhancing the strength of the separator 10.

Figure 11:
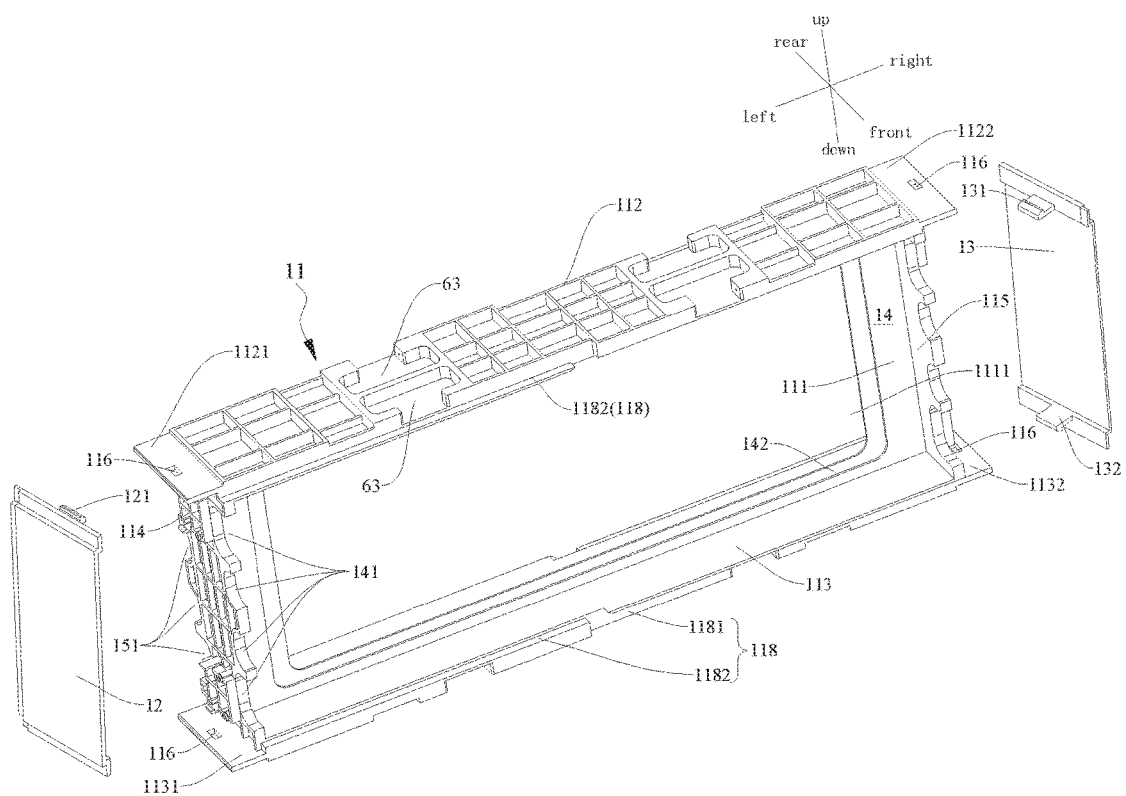
FIG. 11 is a perspective view of a separator of the power battery module shown in FIG. 9.
Figure 12:
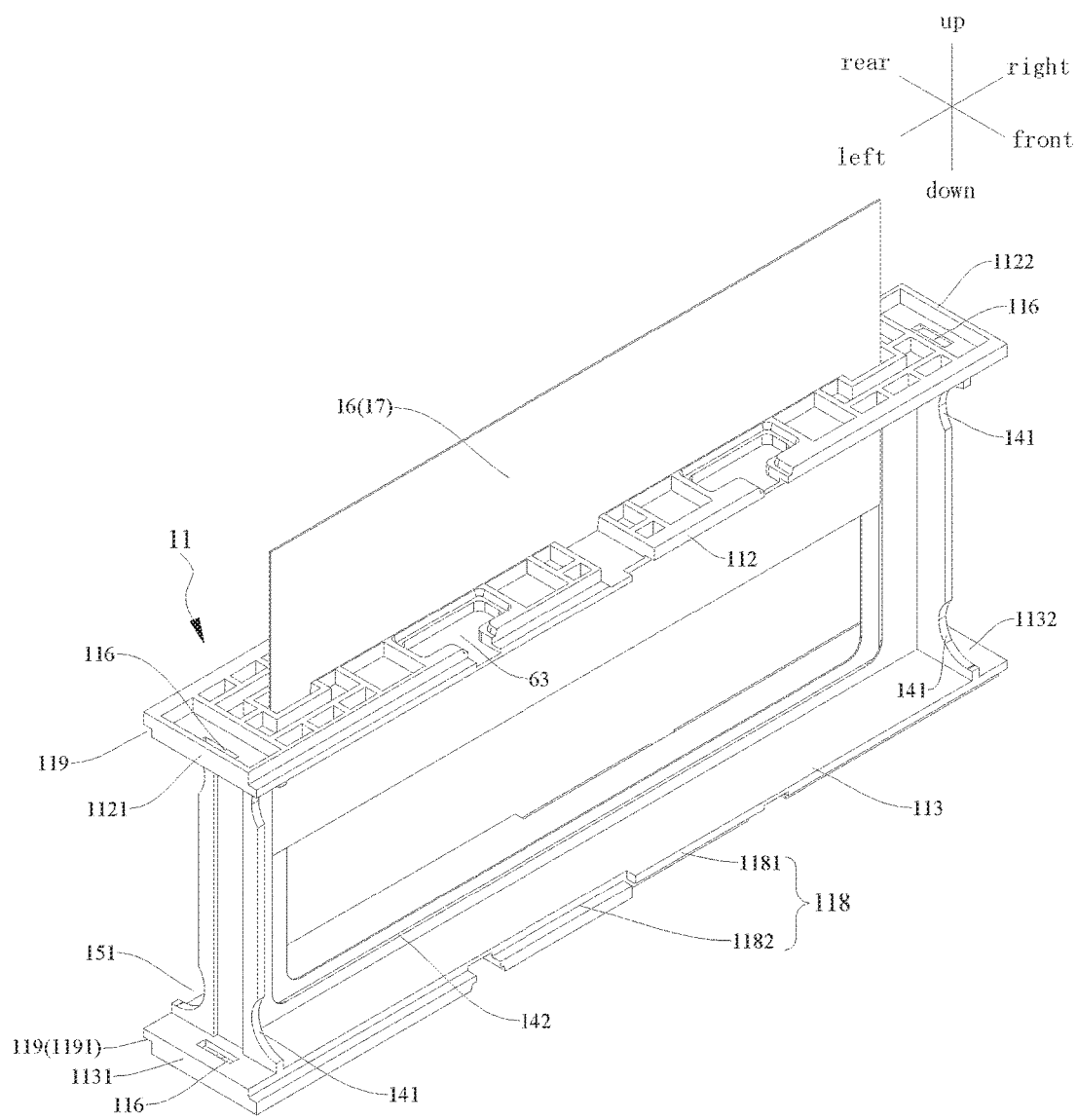
FIG. 12 is a schematic view showing an assembling relationship between a separator of a battery accommodating assembly and an insulating plate or a heat conducting plate of the power battery module shown in FIG. 9.

As shown in FIGS. 6, 11 and 12, the separator body 11 includes a vertical plate 111, an upper frame plate 112, a lower frame plate 113, a left plate 114 and a right plate 115. The upper frame plate 112 is disposed at a top edge of the vertical plate 111, the lower frame plate 113 is disposed at a bottom edge of the vertical plate 111, the left plate 114 is disposed at a left end of the vertical plate 111 and has an upper end connected with the upper frame plate 112 and a lower end connected with the lower frame plate 113, and the right plate 115 is disposed at a right end of the vertical plate 111 and has an upper end connected with the upper frame plate 112 and a lower end connected with the lower frame plate 113.

Each of the front accommodating groove 14 and the rear accommodating groove is defined by the vertical plate 111, the upper frame plate 112, the lower frame plate 113, the left plate 114 and the right plate 115. Therefore, the separator body 11 has a simple structure and is easy to manufacture. In an embodiment of the present disclosure, the separator 10 may be formed integrally, i.e. the vertical plate 111, the upper frame plate 112, the lower frame plate 113, the left plate 114 and the right plate 115 may be formed integrally, such that a connection strength between the vertical plate 111, the upper frame plate 112, the lower frame plate 113, the left plate 114 and the right plate 115 is improved, thus improving a structure strength of the separator 10. Furthermore, a protection of the battery accommodating assembly 100 for the battery 101 is improved.

Alternatively, the front notch 141 may be formed in a front edge of each of the left plate 114 and the right plate 115, and the rear notch 151 may be formed in a rear edge of each of the left plate 114 and the right plate 115. In other words, the through holes may be formed in both left and right sides of the battery chamber respectively, such that the electrodes of the battery 101 can extend out of the battery chamber via the through holes. The positions of the positioning hole 621 of the anti-explosion valve, the injection hole and the through hole for the electrode can be arranged according to the structure of the battery 101. A plurality of the front notches 141 are arranged and spaced apart from one another in the up-down direction, and a plurality of the rear notches 151 are arranged and spaced apart from one another in the up-down direction, i.e. a plurality of though holes are formed in both the left and right sides of the battery chamber.

In addition, when the power battery module 1000 works normally, a gap may be formed between a peripheral wall of the battery chamber and the battery 101, such that the battery 101 can be cooled by air within the power battery 1000. When there is an abnormal condition in the battery 101 of the power battery module 1000, for example when the battery 101 is swollen, the gap between the peripheral wall of the battery chamber and the battery 101 can tolerate the deformation of the battery 101 in a thickness direction thereof, thus improving the safety of the power battery module 1000.

An annular step 142 is disposed on a bottom wall of at least one of the front accommodating groove 14 and the rear accommodating groove. In an embodiment of the present disclosure, the annular step 142 is disposed on the bottom wall of each of the front accommodating groove 14 and the rear accommodating groove. By disposing the annular step 142, the bottom walls of the front accommodating groove 14 and the rear accommodating groove can be separated from an outer surface of the battery 101, thus ensuring the gap between the peripheral wall of the battery chamber and the battery 101.

Alternatively, a surface of the bottom wall of at least one of the front accommodating groove 14 and the rear accommodating groove is inclined downward from a periphery of the bottom wall to a center of the bottom wall. In an embodiment of the present disclosure, the surface of the bottom wall of each of the front accommodating groove 14 and the rear accommodating groove is inclined downward from the periphery of the bottom wall to the center of the bottom wall, thus ensuring the gap between the peripheral wall of the battery chamber and the battery 101. The surface of the bottom wall of the front accommodating groove 14 and the rear accommodating groove may be a surface of the vertical plate 111.

In order to meet a requirement of safety and reliability, the separator 10 may be made of an engineering plastic and a composite material having a high strength, a high corrosion resistance, a great weather fastness, a good fire resistance and a high insulation property, such as PPO (poly(phenylene oxide)), PP (polypropylene), PET (polyethylene terephthalate), ABS (acrylonitrile butadiene styrene), PC (polycarbonate) or these materials embedded with metal therein. Therefore, the separator 10 according to embodiments of the present disclosure has a high strength and can protect the battery 101 effectively in abnormal conditions, such as a collision to the power battery module 1000. For example, the separator body 11 may be formed by overall injection molding, and the metal may be embedded into these materials during the injection molding, so that the structure strength of the separator 10 is further improved. Moreover, the separator 10 may be demolded directly after the injection molding, so that the separator 10 is convenient to manufacture and the cost is saved.

As shown in FIG. 12, a front step 118 is disposed at a front side edge of each of the upper frame plate 112 and the lower frame plate 113, and a rear step 119 is disposed at a rear side edge of each of the upper frame plate 112 and lower frame plate 113. When the plurality of separators 10 are assembled together, the front step 118 disposed at the front side edge of the upper frame plate 112 of one of the adjacent separators 10 is lapped with the rear step 119 disposed at the rear side edge of the upper frame plate 112 of the other one of the adjacent separators 10. Similarly, the front step 118 disposed at the front side edge of the lower frame plate 113 of one of the adjacent separators 10 is lapped with the rear step 119 disposed at the rear side edge of the lower frame plate 113 of the other one of the adjacent separators 10. Thus, an appearance of the battery accommodating assembly 100 is aesthetic, and adjacent separators 10 can be closely connected with each other. Moreover, the assembling efficiency of the power battery module 1000 is improved and the manufacture cost of the power battery module 1000 is reduced. In an embodiment of the present disclosure, the front step 118 may face downward and the rear step 119 may face upward, such that the corresponding front step 118 and rear step 119 can be fitted with each other better.

In an embodiment of the present disclosure as shown in FIG. 12, the front step 118 includes a first front step segment 1181 facing downwards and a second front step segment 1182 facing upwards, and the rear step 119 includes a first rear step segment facing upwards and corresponding to the first front step segment 1181 and a second rear step segment 1191 facing downwards and corresponding to the second front step segment 1182. Therefore, the adjacent separators 10 can be assembled with each other closer, so that a better assembly effect can be implemented. Moreover, by dividing the front step 118 and the rear step 119 into two segments respectively, the adjacent separators 10 can be assembled together and positioned with respect to each other due to a connection between the front step 118 and the rear step 119, and the connection between the adjacent separators 10 is stable.

In some embodiments of the present disclosure, a window 1111 may be formed in the vertical plate 111 to communicate the front accommodating groove 14 with the rear accommodating groove, i.e. the front accommodating groove 14 and the rear accommodating groove are communicated with each other. In other words, the vertical plate 111 is configured as a structure penetrated therethrough in the front-rear direction, thus saving a manufacture material and reducing the cost.

An insulating plate 16 or a heat conducting plate 17 may be disposed in the window 1111. By disposing the insulating plate 16, the insulation between adjacent batteries 101 can be improved, so that a safety performance of the power battery module 1000 can be increased. By disposing the heat conducting plate 17, the radiation effect of the battery 101 within the battery chamber can be improved, such that the safety performance of the power battery module 1000 can also be increased and a working life of the battery 101 can be lengthened.

Specifically, an insertion hole is formed in the upper frame plate 112, and an inserting groove aligned with the inserting hole is formed in the vertical plate 111, and the insulating plate 16 or the heat conducting plate 17 is inserted into the window 1111 via the insertion hole and the inserting groove. Thus, the insulating plate 16 or the heat conducting plate 17 may be mounted on the separator 10 conveniently.

As shown in FIGS. 1-3, 6, 7, 9 and 11, in some embodiments of the present disclosure, the left cover 12 and the right cover 13 can be formed with the separator body 11 integrally, such that a connection strength between the separator body 11 and the left cover 12 and the right cover 13 is improved, and a complex assembly process of the left cover 12 and the right cover 13 can be avoided, thus increasing an assembling speed.

Certainly, the present disclosure is not limited to this, the left cover 12 and the right cover 13 may be detachably disposed on the separator body 11 respectively. In other words, the separator body 11, the left cover 12 and the right cover 13 may be produced independently, and then the left cover 12 and the right cover 13 are disposed on the separator body 11 via a connection structure. Therefore, when one of the separator body 11, the left cover 12 and the right cover 13 is damaged, it is just required to replace the corresponding one without replacing the whole assembly, thus facilitating maintenance and saving a maintenance cost.

In an embodiment of the present disclosure as shown in FIG. 6, a cover insertion slot 117 may be formed in the separator body 11, and a cover clasp 134 snapped in the cover insertion slot 117 may be disposed on each of the left cover 12 and the right cover 13. By snapping the cover clasp 134 within the cover insertion slot 117, the left cover 12 and the right cover 13 are disposed on the separator body 11 respectively, such that the connections between the left cover 12 and the separator 10 and between the right cover 13 and the separator 10 are simple. As shown in FIG. 6, the cover clasps 134 may be disposed on upper and lower ends of the left cover 12 and the right cover 13, such that the left cover 12 and the right cover 13 can be disposed on the separator body 11 stably.

In another embodiment of the present disclosure as shown in FIG. 11, a left end of the upper frame plate 112 extends leftward beyond the left plate 114 so as to form a left-upper extending part 1121, a left end of the lower frame plate 113 extends leftward beyond the left plate 114 so as to form a left-lower extending part 1131, a right end of the upper frame plate 112 extends rightward beyond the right plate 115 so as to form a right-upper extending part 1122, and a right end of the lower frame plate 113 extends rightward beyond the right plate 115 so as to form a right-lower extending part 1132. Moreover, a snapping slot 116 is formed in each of the left-upper extending part 1121, the left-lower extending part 1131, the right-upper extending part 1122 and the right-lower extending part 1132. Correspondingly, a left-upper clasp 121 snapped in the snapping slot 116 of the left-upper extending part 1121 and a left-lower clasp snapped in the snapping slot 116 of the left-lower extending part 1131 are disposed on a right surface of the left cover 12, and a right-upper clasp 131 snapped in the snapping slot 116 of the right-upper extending part 1122 and a right-lower clasp 132 snapped in the snapping slot 116 of the right-lower extending part 1132 are disposed on a left surface of the right cover 13. Therefore, it is more convenient to dispose the left cover 12 and the right cover 13 on the separator 10.

As shown in FIG. 11, the left-upper clasp 121 and the left-lower clasp may be disposed on the right surface of the left cover 12, and the right-upper clasp 131 and the right-lower clasp 132 may be disposed on the left surface of the right cover 13, such that the connection strength between the left cover 12 and the left-upper clasp 121 and the left-lower clasp and between the right cover 13 and the right-upper clasp 131 and the right-lower clasp 132 are improved.

Alternatively, the left cover 12 and the right cover 13 have a width in a front-rear direction larger than or equal to a width of the left plate 114 and the right plate 115 in the front-rear direction, and less than or equal to a width of the upper frame plate 112 and the lower frame plate 113 in the front-rear direction. When the left cover 12 and the right cover 13 have the width in the front-rear direction larger than the width of the left plate 114 and the right plate 115 in the front-rear direction, gaps may be formed between the left plates 114 of the adjacent separators 10 and between the right plates 115 of the adjacent separators 10, such that the left cover 12 can cover the gap between the left plates 114 and the right cover 13 can cover the gap between the right plates 115. When the left cover 12 and the right cover 13 have the width in the front-rear direction equal to the width of the left plate 114 and the right plate 115 in the front-rear direction, the left plates 114 of the adjacent separators 10 are closely contacted with each other and the right plates 115 of the adjacent separators 10 are closely contacted with each other, such that the left plate 114, the right plate 115, the left cover 12 or the right cover 13 can protect the battery 101 properly.

In order to meet a requirement of safety and reliability of the left cover 12 and the right cover 13, the left cover 12 and the right cover 13 may be made of an engineering plastic and a composite material having a high strength, a high corrosion resistance, a great weather fastness, a good fire resistance and a high insulation property, such as PPO (poly (phenylene oxide)), PP (polypropylene), PET (polyethylene terephthalate), ABS (acrylonitrile butadiene styrene), PC (polycarbonate) or these materials embedded with metal therein. Therefore, the left cover 12 and the right cover 13 have a high strength, a high corrosion resistance and a good fire resistance, and can protect the battery 101 effectively in abnormal conditions, such as a collision to the power battery module 1000.

As shown in FIGS. 1-3 and 7-9, in some embodiments of the present disclosure, the battery accommodating assembly 100 further includes a front plate 20. The front plate 20 defines a rear groove 21 in a rear portion thereof. The rear groove 21 of the front plate 20 and the front accommodating groove 14 of the frontmost separator 10 of the plurality of separators 10 define the frontmost battery chamber. The front plate 20 is snapped with the frontmost separator 10, for example, the front plate 20 may be snapped with the frontmost separator 10 via a snapping structure 60. The front plate 20 may not define a groove in a front portion thereof, such that the front plate 20 has a simple structure and is easy to manufacture, thus saving materials and space.

Correspondingly, the battery accommodating assembly 100 further includes a rear plate 30. The rear plate 30 defines a front groove in a front portion thereof. The front groove and the rear accommodating groove of the rearmost separator 10 of the plurality of separators 10 define the rearmost battery chamber. The rear plate 30 is snapped with the rearmost separator 10, for example, the rear plate 30 may be snapped with the rearmost separator 10 via the above snapping structure 60. The rear plate 30 may not define a groove in a rear portion thereof, such that the rear plate 30 has a simple structure and is easy to manufacture, thus saving materials and space. In an embodiment of the present disclosure, the left cover 12 may be disposed at a left side of the front plate 20 and the right cover 13 may be disposed at a right side of the front plate 20, and the left cover 12 may be disposed at a left side of the rear plate 30 and the right cover 13 may be disposed at a right side of the rear plate 30, such that the front plate 20 and the rear plate 30 can be protected better.

In some embodiments of the present disclosure, the snapping hole 1123 is formed in at least one of upper and lower walls of the front accommodating groove 14 and the rear accommodating groove. In other embodiments of the present disclosure, the snapping hole 1123 is formed in at least one of a rear portion of the front plate 20 and a rear portion of the rear plate 20.

The line snap-fit 200 according to embodiments of the present disclosure will be described in the following with reference to FIGS. 15-19.

The snap-fit body 210 is substantially configured to have an arched shape, that is, in a width direction of the snap-fit body 210, a middle portion of the snap-fit body 210 protrudes upwards and two end portions of the snap-fit body 210 locate under the middle portion of the snap-fit body 210. An open portion 214 is formed at a lower end of the line groove 211, such that lines or wires may be inserted into the line groove 211 from down to up and accommodated in the line groove 211. Thus, lines or wires may be assembled more easily.

In some embodiments of the present disclosure, the snap-fitting portion 220 is disposed on two sides of the open portion 214. Thus, the line snap-fit 200 may be fastened to the separator 10 more stably. In other embodiments of the present disclosure, the snap-fitting portion 220 is disposed on each side of the open portion 214, and the snap-fitting portions 220 disposed on two sides of the open portion 214 are symmetric to each other. That is, in the width direction of the snap-fit body 210, two snap-fitting portions 220 are symmetric to each other, such that the line snap-fit 200 may be fastened to the separator 10 more stably.

Figure 15:
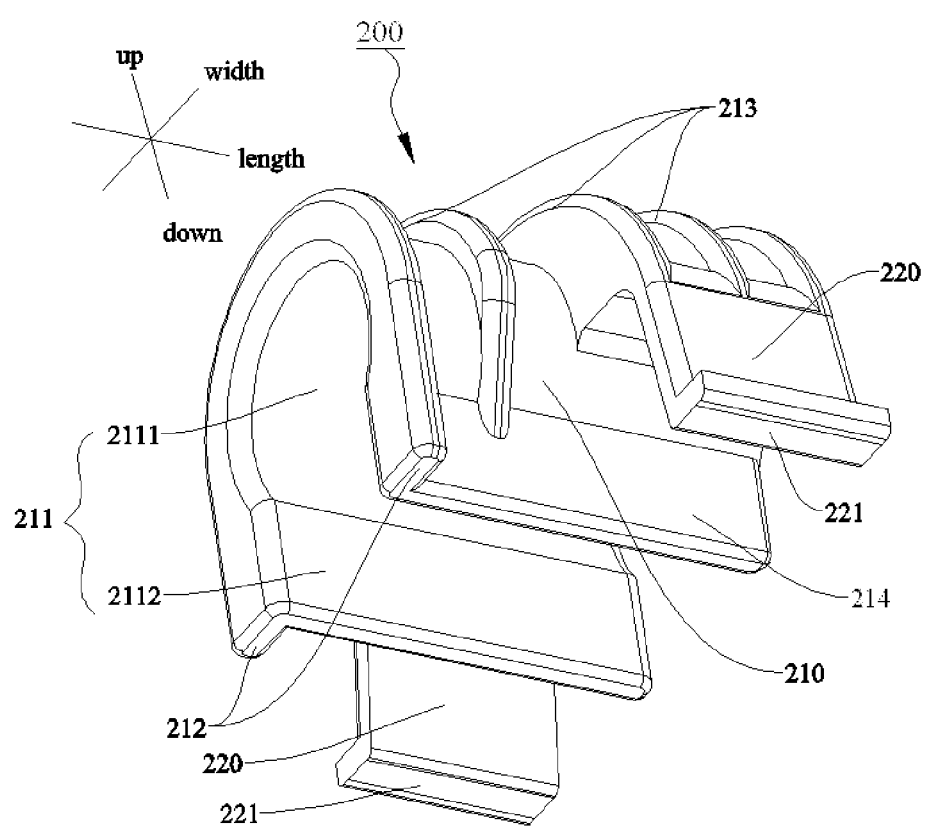
FIG. 15 is a perspective view of a line snap-fit according to an embodiment of the present disclosure.
Figure 16:
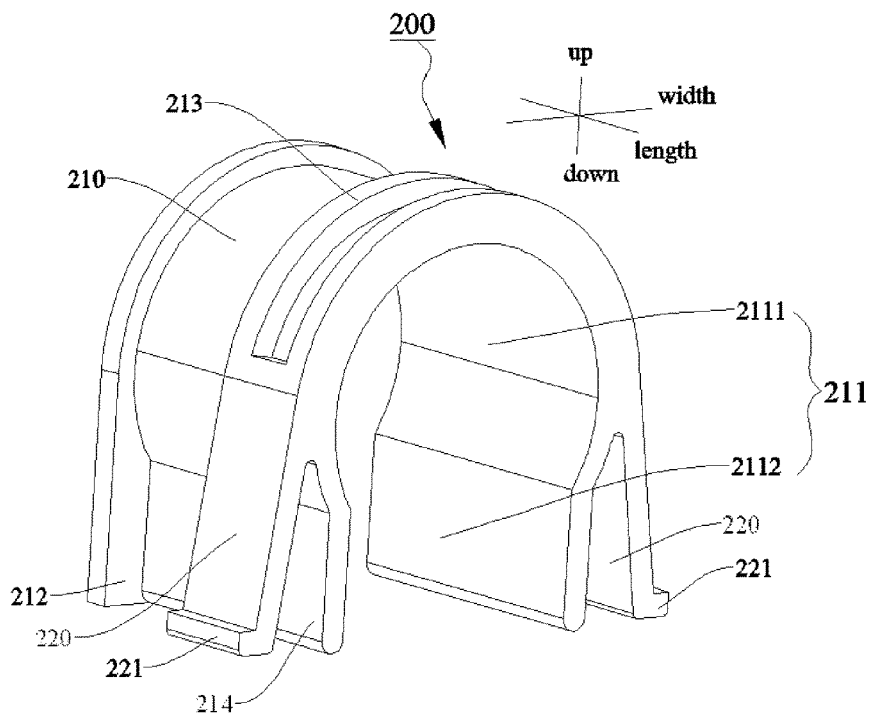
FIG. 16 is a perspective view of a line snap-fit according to another embodiment of the present disclosure.
Figure 17:
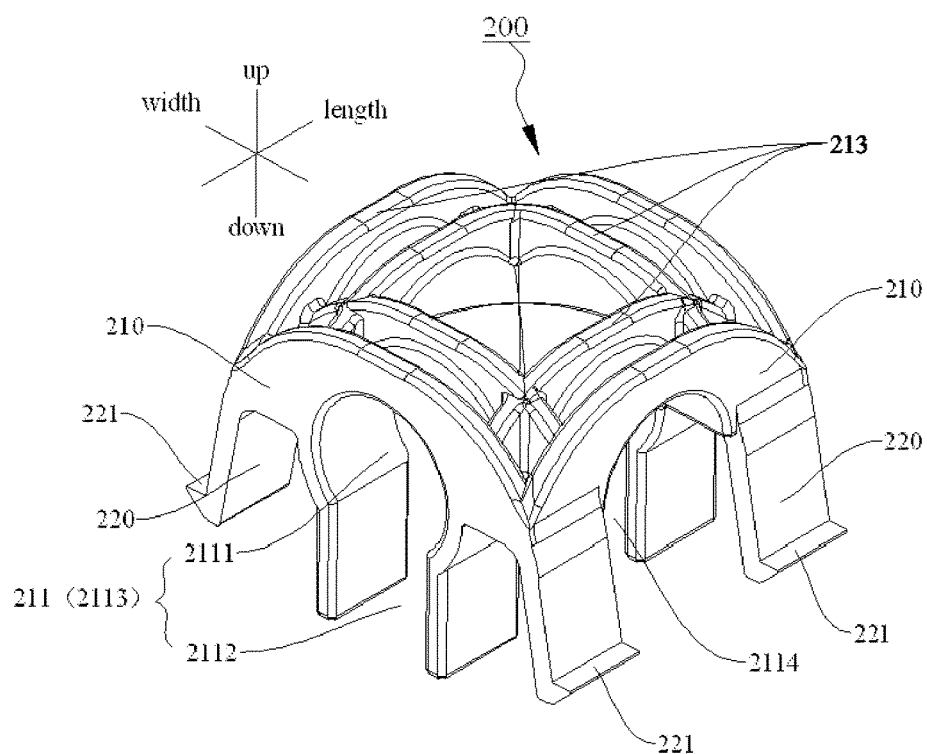
FIG. 17 is a perspective view of a line snap-fit according to a further embodiment of the present disclosure.
Figure 18:
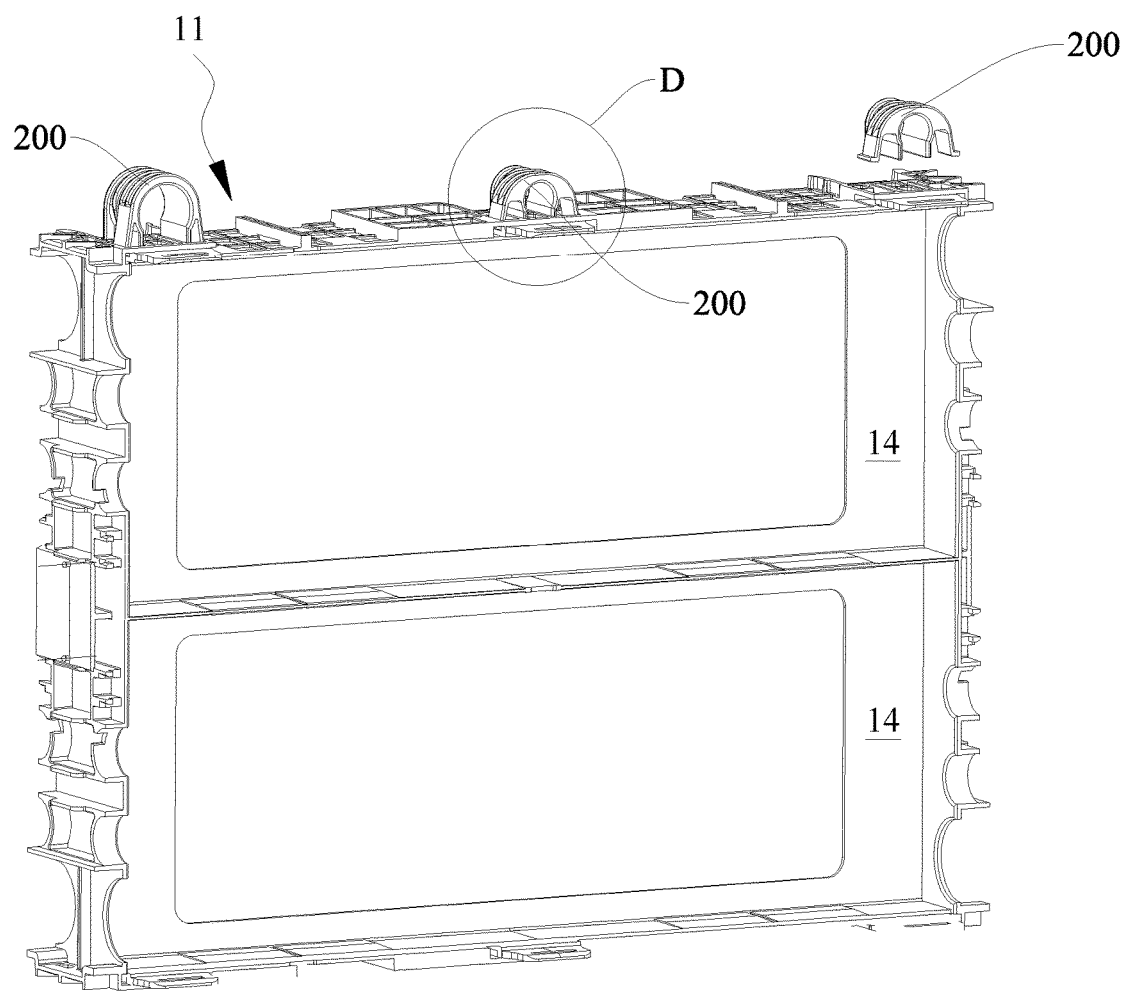
FIG. 18 is a schematic view showing an assembling relationship between a line snap-fit and a separator according to an embodiment of the present disclosure.
Figure 19:
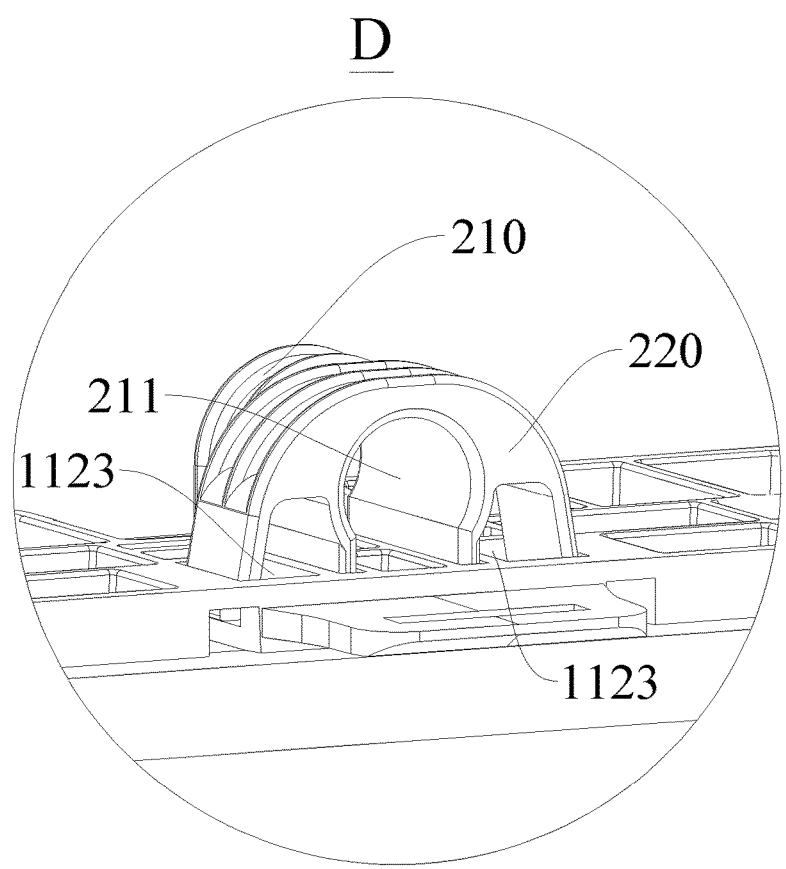
FIG. 19 is an enlarged view of region D shown in FIG. 18.
Figure 20:
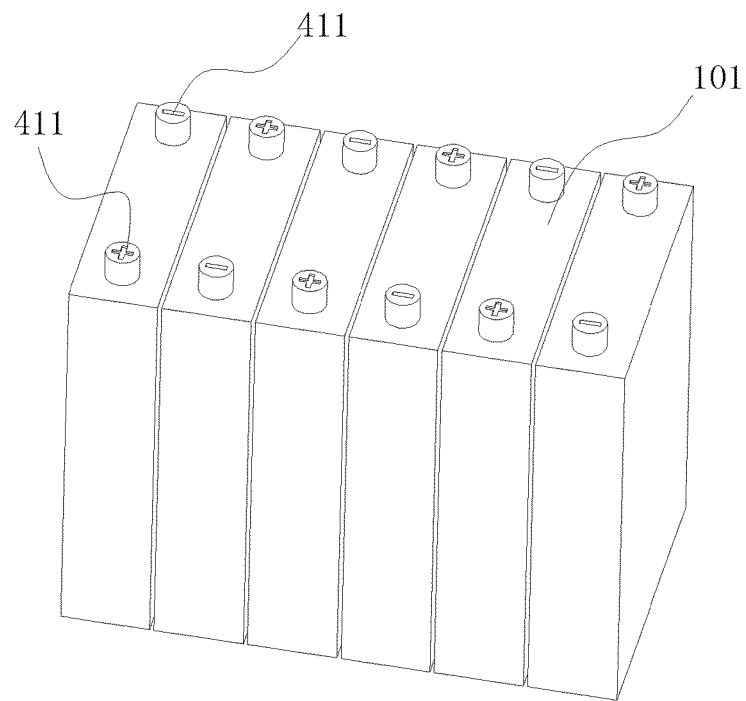
FIG. 20 is a schematic view of a battery group of a power battery module according to an embodiment of the present disclosure.

In some embodiments of the present disclosure, a first end of the snap-fitting portion 220 is connected with the snap-fit body 210, and the line clasp 221 is disposed on a second end of the snap-fitting portion 220. As shown in FIGS. 15, 16 and 17, an upper end of the snap-fitting portion 220 is connected with the snap-fit body 210, and the line clasp 221 is disposed on a lower end of the snap-fitting portion 220. Thus, the line snap-fit 200 may have a simple structure and the line snap-fit 200 may be manufactured easily.

In some embodiments of the present disclosure, the line groove 211 includes: a line accommodating portion 2111 configured to accommodate a line; and a transition portion 2112 disposed at a lower end of the line accommodating portion 2111 and communicated with the line accommodating portion 2111. A lateral size of the transition portion 2112 is less than that of the line accommodating portion 2111, and a lower end of the transition portion 2112 is open. Specifically, in assembling lines or wires, the lines or wires may be received in the line accommodating portion 2111 by inserting the lines or wires into the line accommodating portion 2111 from the lower end of the transition portion 2112.

The size of the line accommodating portion 2111 may match with the size of lines or wires to accommodate the lines or wires. In some embodiments of the present disclosure, the size of the transition portion 2112 is slightly less than the size of the lines or wires. Thus, when the lines or wires are accommodated in the line accommodating portion 2111, the lines or wires may be prevented from being dropped out of the line accommodating portion 2111 under a relatively small force, such that the lines or wires may be assembled and limited in the line accommodating portion 2111 more stably. The width of the transition portion 2112 cannot be too large, otherwise the transition portion 2112 may lose its limiting effect for the lines or wires; and the width of the transition portion 2112 cannot be too small, otherwise the lines or wires cannot be inserted into the line accommodating portion 2111.

In some embodiments of the present disclosure, a cross-section of the line accommodating portion 2111 is configured to have a circular shape, as shown in FIGS. 15, 16 and 17. Thus, the shape of the line accommodating portion 2111 may match with the shape of the lines or wires, the lines or wires may be well accommodated in the line accommodating portion 2111. In some embodiments of the present disclosure, a cross-section of the transition portion 2112 is configured to have a rectangular shape, and a width of the transition portion 2112 is less than a diameter of the line accommodating portion 2111. For example, the ratio of the diameter of the line accommodating portion 2111 to the width of the transition portion 2112 is 1.5:1.2, such that the lines or wires may be pressed into the line accommodating portion 2111 smoothly and easily from the transition portion 2112 while ensuring that the lines or wires may be limited by the line accommodating portion 2111 and the transition portion 2112 effectively. In some embodiments of the present disclosure, the lateral size of the transition portion 2112 is gradually decreased from up to down, such that the lines or wires may be limited in the line accommodating portion 2111 better.

In some embodiments of the present disclosure, the cross-section of the line accommodating portion 2112 is configured to have a square shape, and the cross-section of the transition portion 2111 is configured to have a rectangular shape. Thus, the cross-section of the transition portion 2111 may be suitable for more actual requirements. The cross-section of the transition portion 2111 may also be configured to have an oval shape, a polygonal shape, an irregular shape, and so on, according to the shape of the lines or wire, and assembling requirements.

In some embodiments of the present disclosure, an internal wall surface of the line accommodating portion 2111 is configured as a smooth surface and a fillet is formed at an edge of the line accommodating portion 2111. Thus, an insulating layer on a surface of the lines or wires may be prevented from being abraded due to a long term of friction between the lines or wires and the line accommodating portion 2111, thus improving a safety performance of the lines or wires.

In some embodiments of the present disclosure, as shown in FIG. 17, the line groove 211 includes a first line groove 2113 and a second line groove 2114, the snap-fitting portion 220 is disposed on an external wall surface of the first line groove 2113, and extension directions of the first line groove 2113 and the second line groove 2114 are intersected. Thus, the lines or wires extending in two directions may also be fastened by the line snap-fit 200, thus a range of application of the line snap-fit 200 may be expanded and the lines or wires may extend in various directions. In one embodiment of the present disclosure, the first line groove 2113 is vertical to and communicated with the second line groove 2114, such that the line groove 211 may be manufactured more easily.

In some embodiments of the present disclosure, the line snap-fit 200 is fixed on at least one of the upper and lower walls of the front accommodating groove 14, and the upper and lower walls of the rear accommodating groove via the snapping hole 1123. In other embodiments of the present disclosure, the line snap-fit 200 is fixed on at least one of the front portion of the front plate 20 and the rear portion of the rear plate 30 via the snapping hole 1123. In one embodiment of the present disclosure, the line snap-fit 200 disposed on the front portion of the front plate 20 and the rear portion of the rear plate 30 includes the first line groove 2113 and the second line groove 2114.

In some embodiments of the present disclosure, a size of the snap-fitting portion 220 is less than that of the snap-fit body 210 in the length direction, and a surface of an end of the snap-fitting portion 220 is flush with a surface of an end of the snap-fit body 210. For example, as shown in FIGS. 15-16, a surface of a lower end of the snap-fitting portion 220 is flush with a surface of a lower end of the snap-fit body 210. Thus, a consumption rate of materials may be reduced, and the line snap-fit 200 may have a simple and reasonable structure, and the snap-fitting portion 220 may be easily fixed to the separator 10.

In some embodiments of the present disclosure, the snap-fitting portion 220 is configured to have substantially the same arched shape as the snap-fit body 210, a size of the snap-fitting portion 220 is larger than that of the snap-fit body 210 both in a width direction and in an up-down direction. That is, in the width direction, the size of the snap-fitting portion 220 is larger than that of the snap-fit body 210, and in the up-down direction, the size of the snap-fitting portion 220 is larger than that of the snap-fit body 210. In other words, the snap-fitting portion 220 is disposed on an exterior of the snap-fit body 210, and the line clasps 221 are disposed on two ends of the snap-fitting portion 220 in the width direction and extend outwards. Thus, the line clasp 221 may outwardly inserted in a snapping groove in the separator 10 to improve the connection strength and stability between the line snap-fit 200 and the separator 10.

The size of the line clasp 221 of the snap-fitting portion 220 may be designed in consideration of the connection strength and stability between the line snap-fit 200 and the separator 10, and conveniences of assembling the line snap-fit 200. For example, if the size of the line clasp 221 is too small, the drawing force of the line clasp 221 is also small, such that the connection strength between the line snap-fit 200 and the separator 10 may be low, and the connection between the line snap-fit 200 and the separator 10 may be unstable (that is, the line clasp 221 may fall off due to vibration); if the size of the line clasp 221 is too large, it may not be easy to install the line clasp 221, and when the line clasp 221 is repeatedly assembled, the line clasp 221 may be broken. Therefore, in some embodiments of the present disclosure, an extension length of the line clasp 221 is about 1 millimeter to about 3 millimeters to ensure the connection strength and stability between the line snap-fit 200 and the separator 10, such that the line snap-fit 200 may be easily assembled and disassembled easily, and the line clasp 221 has a good strength and will not be broken due to repeatedly assembling.

As shown in FIG. 15 and FIG. 16, in some embodiments of the present disclosure, the snap-fitting portion 220 is disposed adjacent to a first end of the line groove 211, and a limiting flange 212 is disposed on a second end of the line groove 211. That is, the snap-fitting portion 220 and the limiting flange 212 are disposed on two ends of the snap-fit body 210 in the length direction. With the limiting flange 212, a degree of freedom of the line snap-fit 200 in the length may be limited to further improve an installation stability of the line snap-fit 200.

In some embodiments of the present disclosure, a plurality of strengthening ribs 213 are disposed on an outer surface of the snap-fit body 210 and an outer surface of the snap-fitting portion 220. Thus, the strength of the snap-fit body 210 and the snap-fitting portion 220 may be increased and a service life of the snap-fit body 210 and the snap-fitting portion 220 may be lengthened. In some embodiments of the present disclosure, the number of the strengthening ribs 213 is 2 to 6.

In some embodiments of the present disclosure, the snap-fit body 210 and the snap-fitting portion 220 are formed integrally to increase connection strength between the snap-fit body 210 and the snap-fitting portion 220, and therefore the line snap-fit 200 may have a stable structure and a long service life. Specifically, the snap-fit body 210 and the snap-fitting portion 220 may be formed by injection molding, after the snap-fit body 210 and the snap-fitting portion 220 are molded, the snap-fit body 210 and the snap-fitting portion 220 may be demolded directly, and therefore it is easy to manufacture the snap-fit body 210 and the snap-fitting portion 220, and the cost is lower.

In order to improve the strength, corrosion resistance and weather resistance of the line snap-fit 200, the line snap-fit 200 may be made of materials having a high strength, a high corrosion resistance, a great weather fastness, such as PPO (poly(phenylene oxide)), ABS (acrylonitrile butadiene styrene), PC (polycarbonate) or these materials embedded with metal therein.

As shown in FIGS. 1-12, in some embodiments of the present disclosure, the adjacent separators 10 are detachably connected with each other via the snapping structure 60, such that it is convenient to assemble and disassemble the battery accommodating assembly 100, and the assembly process is simplified and the assembly efficiency is improved. Furthermore, for the power battery module 1000, expansibility thereof is improved, a development cost thereof is reduced and a development time thereof is shortened.

The snapping structure 60 according to embodiments of the present disclosure will be described with reference to FIGS. 1-6.

As shown in FIGS. 1-6, the snapping structure 60 includes a snapping groove 61 formed in one of the adjacent separators 10 and a snapping tongue 62 disposed on the other of the adjacent separators 10 and adapted to snap in the snapping groove 61 to fasten the adjacent separators 10 together. In other words, the snapping structure 60 may include the snapping tongue 62 and the snapping groove 61, the snapping tongue 62 is disposed on one of the adjacent separators 10, and the snapping groove 61 is formed in the other of the adjacent separators 10 and is snapped with the snapping tongue 62 to fasten the adjacent separators 10 together.

Moreover, a positioning hole 621 may be formed in the snapping tongue 62, and a positioning boss 612 may be disposed on a bottom wall of the snapping groove 61 and is fitted into the positioning hole 621. Specifically, the positioning boss 612 extends upward into the positioning hole 621 so as to snap the snapping tongue 62 in the snapping groove 61, such that the adjacent separators 10 can be connected with each other. Therefore, the adjacent separators 10 have a simple structure and are easily connected with each other, thus providing the high expansibility. Moreover, the snapping tongue 62 and the snapping groove 61 also have a function of positioning the plurality of separators 10, thus facilitating the positioning between the adjacent separators 10 and improving the assembling speed.

Figure 5:
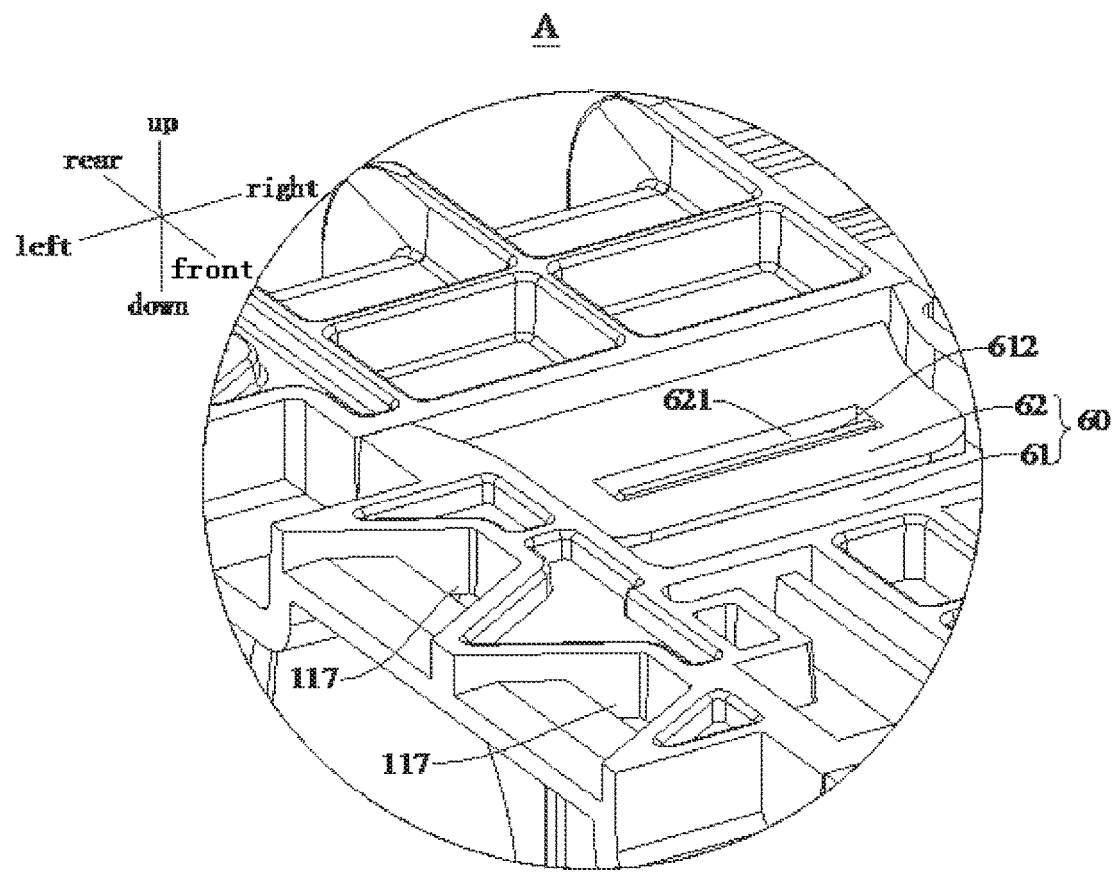
FIG. 5 is an enlarged view of region A in FIG. 4.

As shown in FIGS. 4-6, the separator 10 includes the upper frame plate 112. The upper frame plate 112 is located at a top of the separator 10. The snapping groove 61 is formed in one of front and rear edges of the upper frame plate 112, and the snapping tongue 62 is disposed on the other of the front and rear edges of the upper frame plate 112. In other words, the separator 10 has both of the snapping groove 61 and the snapping tongue 62, such that when the plurality of separators 10 are arranged in a row, the plurality of separators 10 can be snapped with one another sequentially.

Alternatively, the separator 10 includes the lower frame plate 113. The lower frame plate 113 is located at a bottom of the separator 10. The snapping groove 61 is formed in one of front and rear edges of the lower frame plate 113, and the snapping tongue 62 is disposed on the other one of the front and rear edges of the lower frame plate 113. In other words, the snapping structures 60 may be disposed on both of the upper frame plate 112 and the lower frame plate 113 of the separator 10. Further, the snapping structure 60 may be merely disposed on the upper frame plate 112, or the snapping structure 60 may be merely disposed on the lower frame plate 113, or the snapping structures 60 may be disposed on the upper frame plate 112 and the lower frame plate 113 simultaneously. In an embodiment of the present disclosure, the snapping structures 60 are disposed on the upper frame plate 112 and the lower frame plate 113 simultaneously, such that upper portions of the adjacent separators 10 are connected with each other and lower portions of the adjacent separators are also connected with each other, and thus a connection strength and a connection stability between the adjacent separators 10 are improved. Furthermore, the battery accommodating assembly 100 protects the battery 101 more reliably.

A plurality of the snapping tongues 62 may be disposed on the upper frame plate 112 of the separator 10, and a plurality of the snapping grooves 62 in one-to-one correspondence with the snapping grooves 62 may be formed in the upper frame plate 112 of the separator 10. A plurality of the snapping tongues 62 are disposed on the lower frame plate 113 of the separator 10, and a plurality of the snapping grooves 62 in one-to-one correspondence with the snapping grooves 62 are formed in the lower frame plate 113 of the separator 10. Therefore, the connection strength and the connection stability between the adjacent separators 10 are further improved.

In an embodiment of the present disclosure as shown in FIG. 5, the snapping tongue 62 has a trapezoidal shape, i.e. a projection of the snapping tongue 62 in a plane perpendicular to the up-down direction are located is trapezoidal. Correspondingly, the snapping groove 61 may have a trapezoidal shape fitted with the snapping tongue, such that the snapping tongue 62 has a large structure strength. Certainly, the present disclosure is not limited to this, and the snapping tongue 62 and the snapping groove 61 may have any other shapes as long as the snapping tongue 62 can be snapped in the snapping groove 61 stably.

As shown in FIG. 6, a guiding slope 611 may be formed at an opening of the snapping groove 61, and the guiding slope 611 is configured to be inclined downward from an inner end of the snapping groove 612 to the opening thereof. When the battery accommodating assembly 100 is assembled, the guiding slope 611 performs a guiding function on the mounting of the snapping tongue 62, i.e. the snapping tongue 62 is guided to insert into the snapping groove easily via the guiding slope 611, thus improving the assembling speed and reducing the assembling difficulty.

The snapping structure 60 according to another embodiment of the present disclosure will be described in the following with reference to FIGS. 7-14.

As shown in FIGS. 7-14, the snapping structure 60 may include a snap-fit groove 63 and a snap-fit pin 64. The snap-fit groove 63 is formed in the separator 10 and the snap-fit pin 64 is a detachable member with respect to the separator 10 and includes at least two mounting parts 641. The at least two mounting parts 641 are snapped in the snap-fit grooves 63 of at least two separators 10 so as to connect the at least two separators 10 with each other. In other words, the snap-fit pin 64 can connect the at least two adjacent or non-adjacent separators 10 with each other. By disposing the snap-fit pin 64, it is convenient to connect the separators 10 together, and it is easy to assemble the separators 10 rapidly and various assembly manners are provided.

Figure 10:
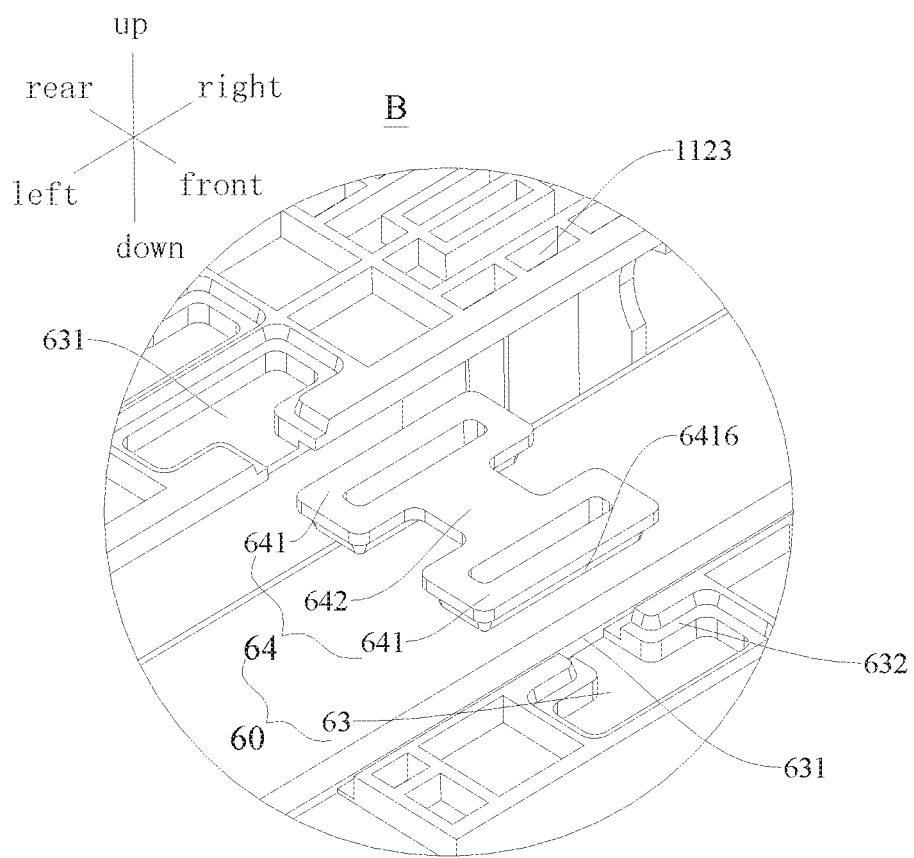
FIG. 10 is an enlarged view of region B shown in FIG. 9.
Figure 13:
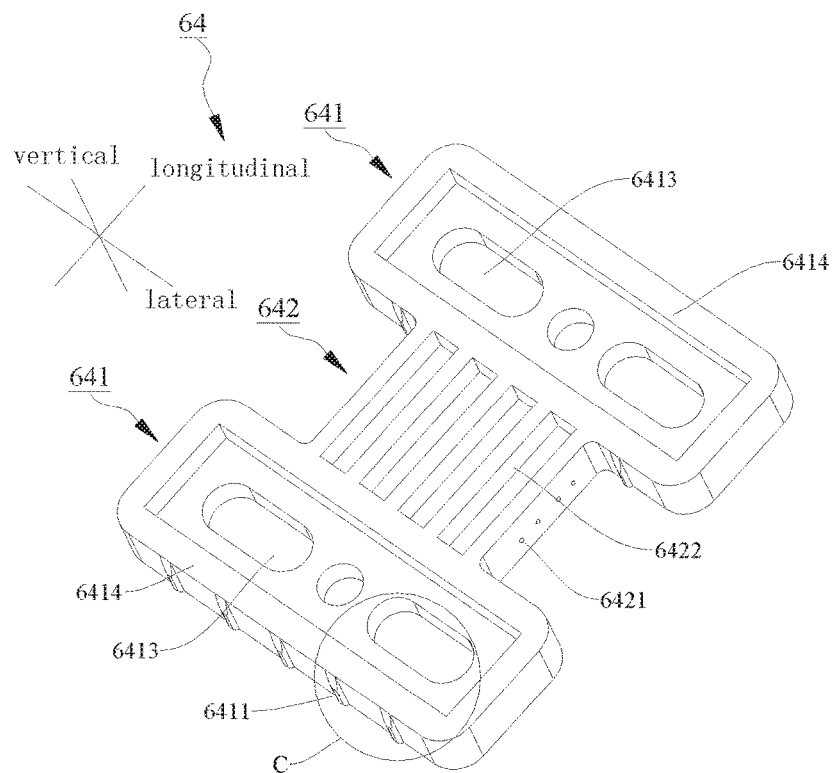
FIG. 13 is a perspective view of a snap-fit pin of the power battery module shown in FIG. 9.

As shown in FIGS. 10 and 13, in some embodiments of the present disclosure, the snap-fit pin 64 may further include a connection bridge 642. Two mounting parts 641 are disposed at two ends of the connection bridge 642 respectively and are fitted in the snap-fit grooves 63 of adjacent separators 10 to connect the adjacent separators 10 with each other. In other words, the snap-fit pin 64 may merely connect the adjacent separators 10 with each other, such that the snap-fit pin 64 may have a relatively small volume and a simple structure. Therefore, a connecting structure between separators 10 of the battery accommodating assembly 100 is simple and it is convenient to assembly the separators 10. By using the snap-fit pin 64 to connect the separators 10 with each other, the power battery module 1000 can include any number of separators 10 according to the actual requirement of the batteries, thus improving the extendibility of the power battery module 1000.

The snap-fit grooves 63 has an opening 631, and the openings 631 of the snap-fit grooves 63 in the adjacent separators 10 are opposed to each other so as to receive the connection bridge 642. Therefore, when the snap-fit pin 64 is disposed between the separators 10, an upper surface of the snap-fit pin 64 is flush with an upper surface of the separator 10, such that the appearance of the battery accommodating assembly 100 is aesthetic and the snap-fit pin 64 is completely embedded into the snap-fit groove 63, thus avoiding a damage to the snap-fit pin 64 due to an external force.

In some embodiments of the present disclosure, the snap-fit groove 63 may be formed in each of the upper frame plates 112 of the adjacent separators 10 and the snap-fit pin 64 may be disposed between the upper frame plates 112 of the adjacent separators 10 to connect the adjacent separators 10 with each other.

Alternatively, the snap-fit groove 63 may be formed in each of the lower frame plates 113 of the adjacent separators 10 and the snap-fit pin 64 may be disposed between the lower frame plates 113 of the adjacent separators 10 to connect the adjacent separators 10 with each other.

In an embodiment of the present disclosure, the snap-fit pin 64 may be merely disposed between the upper frame plates 112 of the adjacent separators 10 or between the lower frame plates 112 of the adjacent separators 10. Alternatively, the snap-fit pins 64 may be disposed between the upper frame plates 112 of the adjacent separators 10 and between the lower frame plates 113 of the adjacent separators 10 simultaneously. Therefore, various connection manners between the separators 10 are provided so as to meet various mounting requirements of the battery accommodating assembly 100. In an embodiment of the present disclosure, the snap-fit pins 64 are disposed between the upper frame plates 112 of the adjacent separators 10 and between the lower frame plates 113 of the adjacent separators 10 simultaneously, such that the upper portions of the adjacent separators 10 are connected with each other and the lower portions of the adjacent separators 10 are connected with each other, and the structure of the battery accommodating assembly 100 is stable, thus providing a more reliable protection of the battery accommodating assembly 100 for the battery 101 and the better safety performance for the power battery module 1000.

Alternatively, the mounting part 641 may have an interference fit engagement with the snap-fit groove 63, or the mounting part 641 may be fitted in the snap-fit groove 63 via a bolt, such that the snap-fit pin 64 can be connected with the separator 10 closely, thus providing the high reliability and high connection strength and improving the working life of the power battery module 1000.

Alternatively, the mounting part 641 may be configured to have a circular, trapezoidal or rectangular shape. In other words, a projection of the mounting part 641 in a plane perpendicular to the up-down direction may be circular, trapezoidal or rectangular. Correspondingly, the snap-fit groove 63 is also configured to have a circular, trapezoidal or rectangular shape matched with the mounting part 641. Therefore, the structure of the mounting part 641 is various and it is convenient to assemble the mounting part 641 onto the separator 10.

In an embodiment of the present disclosure, a step part 6416 is formed on a surface of the mounting part 641 facing the snap-fit groove 63, and a step part 632 corresponding to the step part 6416 of the mounting part 641 is formed in the snap-fit groove 63, such that the mounting part 641 can be fitted in the snap-fit groove 63 more closely, and the snapping structure 60 is more stable and the structure stability of the battery accommodating assembly 100 is further improved.

Figure 14:
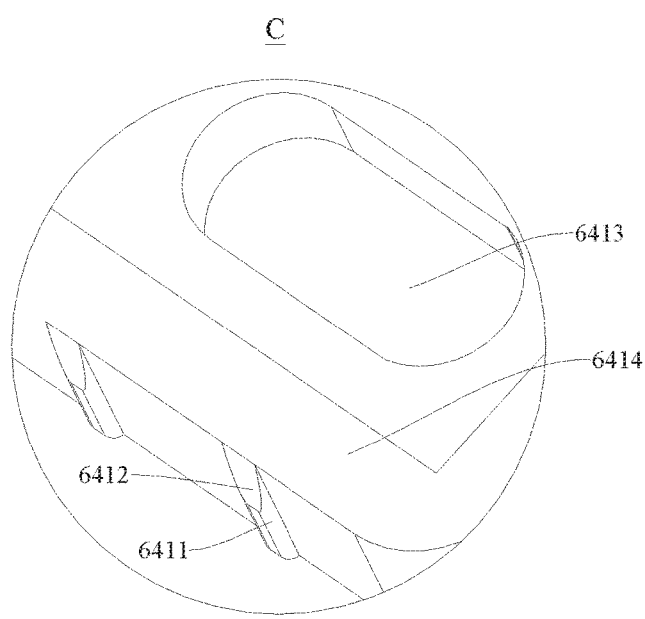
FIG. 14 is an enlarged view of region C shown in FIG. 13.

As shown in FIGS. 13 and 14, the connection bridge 642 extends in a longitudinal direction and two mounting parts 641 are disposed on two ends of the connection bridge 642 in the longitudinal direction and are perpendicular to the longitudinal direction, i.e. the mounting part 641 extends in a lateral direction. In other words, the snap-fit pin 64 is configured to have a substantially "工" shape. A plurality of protruded ridges 6411 extending in a thickness direction of the connection bridge 642 are disposed on an outer end surface of the mounting part 641 away from the connection bridge 642, i.e. the protruded ridge 6411 extends in a vertical direction. When the snap-fit pin 64 is being mounted into the separator 10, the mounting part 641 is fitted with the snap-fit groove 63 and the protruded ridge 6411 disposed on the outer end surface of the mounting part 641 performs a positioning and guiding function, such that the snap-fit pin 64 may be mounted conveniently. Moreover, a friction force may be generated between the protruded ridge 6411 and a wall of the snap-fit groove 63 so as to hold the snap-fit pin 64 during a whole service time of the snap-fit pin 64.

In some embodiments of the present disclosure, a cross-section of the protruded ridge 6411 is configured to have an arc shape. Alternatively, one end of the protruded ridge 6411 has a slope 6412 inclined toward the other end of the protruded ridge 6411, i.e. as shown in FIG. 14, one end (for example, an upper end) of the protruded ridge 6411 in the vertical direction has the slope 6412 inclined toward the other end (for example, an lower end) of the protruded ridge 6411 in the vertical direction. Alternatively, a cross-section of the other end (for example, the lower end) of the protruded ridge 6411 may be configured to have a circular shape. Therefore, it is convenient to assemble the snap-fit pin 64 during a use, and a force in the longitudinal direction may be generated between the protruded ridge 6411 and the wall of the snap-fit groove 63, such that it is hard for the snap-fit pin 64 to have a deformation to get out of the snap-fit groove 63. Certainly, in an embodiment of the present disclosure, the protruded ridge 6411 may be disposed on each of two opposed end surfaces of two mounting parts 641, such that the friction force between the protruded ridge 6411 and the wall of the snap-fit groove 63 can be further improved, thus further increasing the connection strength of the snap-fit pin 64.

In an embodiment of the present disclosure, at least one of the two mounting parts 641 has at least one dismounting hole 6413 penetrating therethrough in the thickness direction thereof. When mounting or dismounting the snap-fit pin 64, an operator can hold the snap-fit pin 64 via the dismounting hole 6413 to mount or dismount the snap-fit pin 64, such that it is easy and convenient to mount or dismount the snap-fit pin 64 rapidly. Alternatively, a mounting member such as a mounting boss or a mounting pin (not shown), fitted with the dismounting hole 6413, may be disposed on a bottom wall of the snap-fit groove 63, such that the snap-fit pin 64 can be fixed on the separator 10 more stably. One or more dismounting holes 6413 may be provided according to the actual assembling requirement.

As shown in FIGS. 13 and 14, the mounting part 641 has a base 6414 extending outward in the thickness thereof. In other words, the base 6414 extends in the longitudinal direction and a surface of the base 6414 is higher than a surface of the mounting part 641 corresponding to the base 6414. The base 6414 is formed at a periphery of the mounting part 641 corresponding to the base 6414. By disposing the base 6414, the structure strength of the mounting part 641 can be increased, and the strength of the snap-fit pin 64 can also be improved. Furthermore, the mounting part 641 is not easy to deform and the connection strength of the snap-fit pin 64 between the separators 10 is improved.

Alternatively, an extended thickness of the base 6414 may be 1 to 10 mm. In an embodiment of the present disclosure, the extended thickness of the base 6414 is 1 to 3 mm, such that the base 6414 has a proper thickness, and the material of the base 6414 can be saved.

Alternatively, at least one strengthening rib 6422 is formed on a surface of the connection bridge 642. By disposing the strengthening rib 6422, the structure strength of the connection bridge 642 is strengthened and the connection bridge 642 is not easy to deform, thus increasing the working life of the snap-fit pin 64.

In some embodiments of the present disclosure, as shown in FIG. 13, a plurality of bosses 6421 are disposed on at least one of two side surfaces of the connection bridge 642 in the lateral direction and are protruded outward from the at least one of two side surfaces of the connection bridge 642. By disposing the plurality of bosses 6421, the friction force between the snap-fit pin 64 and the wall of the snap-fir groove 63 is increased, thus further improving the connection strength between the snap-fit pin 64 and separators 10.

Alternatively, each of the bosses 6421 is configured to have a substantially semispherical shape, such that the snap-fit pin 64 may be conveniently demolded during an injection molding of the snap-fit pin 64. If a size of the boss 6421 is too small, the friction force between the snap-fit pin 64 and the wall of the snap-fit groove 63 is not enough; if the size of the boss 6421 is too large, it is difficult to demold the snap-fit 64. Preferably, a diameter of the boss 6421 is from 1 mm to 2 mm, i.e. a diameter of a connecting part of the boss 6421 and the connection bridge 642 may be from 1 mm to 2 mm, thus ensuring the friction force between the snap-fit pin 64 and the wall of the snap-fit groove 63 and facilitating the demolding of the snap-fit pin 64. The plurality of bosses 6421 are spaced apart from each other in the longitudinal direction, such that the friction force between the snap-fit pin 64 and the wall of the snap-fit groove 63 is uniform.

Considering the connection strength of the snap-fit pin 64 and the cooperation between the snap-fit 64 and the separators 10, a thickness of the whole snap-fit pin 64 may be from 8 mm to 15 mm. In an embodiment of the present disclosure, the thickness of the whole snap-fit pin 64 is from 10 mm to 13 mm, i.e. a thickness of a projection of the snap-fit 64 in the up-down direction is from 10 mm to 13 mm. Therefore, the snap-fit pin 64 has enough strength and materials are saved, and it is convenient and reliable to connect the snap-fit pin 64 with the separators 10.

Alternatively, the snap-fit pin 64 is a plastic molding part or a plastic-metal mixed molding part. For example, the connection bridge 642, the mounting part 641, the protruded ridge 6411, the boss 6421 and the base 6414 are plastic parts and are formed integrally by injection molding, and it is easy and convenient to form these plastic parts. The connection bridge 642, the mounting part 641, the protruded ridge 6411, the boss 6421 and the base 6414 may be made of PPO (poly(phenylene oxide)), PP (polypropylene), PPE (poly (phenyl ether)) or these materials embedded with metal therein. Therefore, these components have a high strength, a high corrosion resistance, a great weather fastness, a good fire resistance and a high insulation property, which meets the requirement of safety performance and reliability of the power battery module 1000, and thus the snap-fit pin 64 has the high structure strength.

Figure 21:
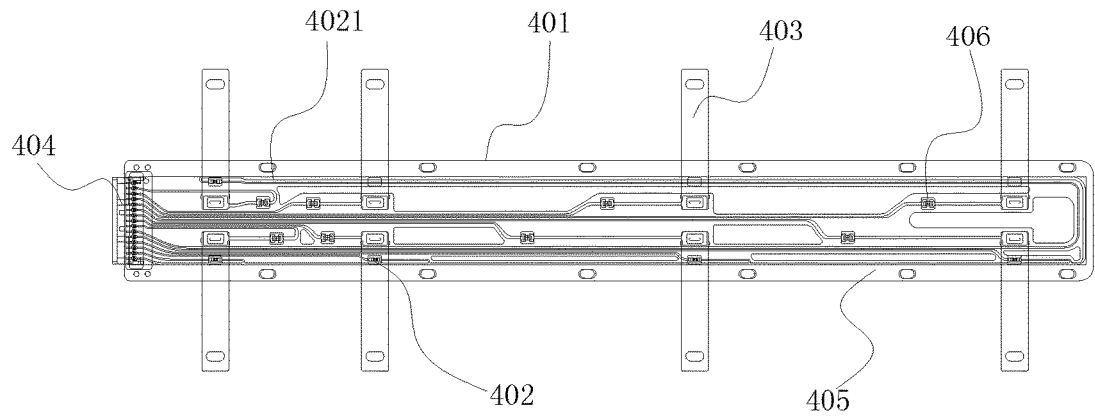
FIG. 21 is a schematic view of a signal collection assembly according to an embodiment of the present disclosure.

The signal collection assembly 400 according to embodiments of the present disclosure will be described in the following with reference to FIGS. 21 and 22.

Figure 22:
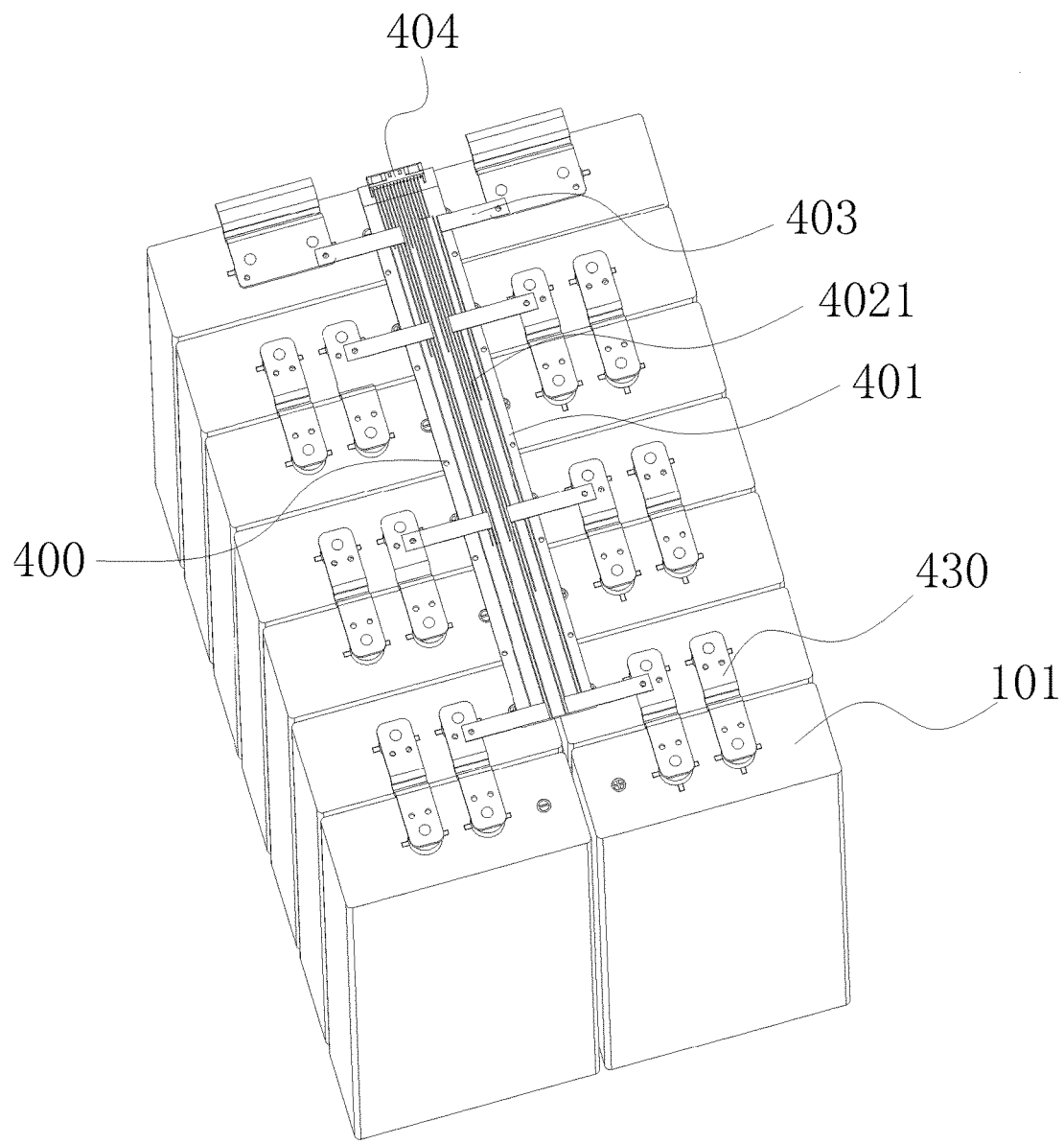
FIG. 22 is an assembling schematic view of a signal collection assembly according to an embodiment of the present disclosure.

As shown in FIG. 22, in some embodiments of the present disclosure, the power battery module 1000 includes a plurality of the batteries 101, two adjacent batteries 101 are connected with each other via the power connection member 430, the signal collection terminal 403 is connected with two power connection members 430 to detect a signal or data of different batteries 101.

The signal collection terminal 403 of the signal collection assembly 400 is connected with the power connection member 430. In order to facilitate the connection between the signal collection terminal 403 and the power connection member 430, in some embodiments of the present disclosure, the second end of the signal collection terminal 403 extends beyond the edge of the substrate 401. Thus, the signal collection terminal 403 may be connected with the power connection members 430 of different batteries 101 easily.

In an embodiment of the present disclosure, the signal collection assembly 400 further includes a connector 404 connected with the signal collection line 4021. Specifically, the connector 404 according to embodiments of the present disclosure is configured to electrically couple with the signal collection line 4021 and is adapted to couple with an external signal output device and a power connection device, and the connector 404 may be a commercially available FPC (flexible printed circuit board) or PCB (printed circuit board) connector according to an actual condition.

An assembling relationship between the connector 404 and the substrate 401 is not limited, as long as the connector 404 can be coupled with the external signal output device and the power connection device to implement the signal transmission and the power connection. In some embodiments, the connector 404 is disposed on the substrate 401. Furthermore, the connector 404 is disposed at an edge of the substrate 401. Correspondingly, the second end of the signal collection line 4021 extends to the edge of the substrate 401. Thus, it is convenient for the connector 404 to couple with the external signal output device and the power connection device.

In an embodiment of the present disclosure, the substrate 401 is a flexible board. Thus, when the substrate 401 is used to connect the power batteries with each other, the flexible substrate 401 can be suitable for relative displacements and assembly tolerances between the plurality of power batteries, thus improving the reliability thereof.

Specifically, the substrate 401 may be made of flexible materials, such as a PI (polyimide) film. The connector 404 is connected with the substrate 401. The substrate 401 is connected with the external signal output device and the power connection device via the connector 404, in which a connection manner thereof may be welding such as a soldering, a mechanical connection and a combination thereof. A structure of the FPC or PCB connector can be understood by those skilled in the related art and is easy to implement, and thus it is omitted herein.

A structure of the signal collection line 4021 is not limited, and an assembling manner of the signal collection line 4021 on the substrate 401 is not limited. In an embodiment of the present disclosure, the signal collection line 4021 is formed by a conductive metal sheet fixed on the substrate 401. Specifically, the conductive metal sheet forming the signal collection line 4021 is fixed on the substrate 401 by at least one of adhering, injection molding, hot pressing and welding. In other words, the signal collection line 4021 is integrated on the substrate 401 by adhering, injection molding, hot pressing or welding. Therefore, it is easy to integrate the signal collection line 4021 on the substrate 401 by these methods, thus reducing a difficulty in forming the signal collection assembly 400.

In an embodiment of the present disclosure, the signal collection line 4021 is formed by a conductive metal layer on the substrate 401. Specifically, the conductive metal layer is a conductive metal coating formed on the substrate 401. In other words, the signal collection line 4021 is a conductive metal coating formed on the substrate 401, and the conductive metal coating may be formed by electroplating or chemical plating. Thus, it is more convenient to form and integrate the signal collection line 4021 on the substrate 401 without a secondary connection or assembling, thus improving an accuracy and reliability of the signal transmission and power connection.

In an embodiment of the present disclosure, the substrate 401 is the flexible board and the signal collection line 4021 is formed by etching a conductive metal foil on the substrate 401. In other words, the signal collection line 4021 is formed on the substrate 401 by etching the conductive metal foil. Therefore, it is convenient to form the signal collection line 4021 on the substrate 401.

It can be understood that, a line slot (not shown) may be formed in a surface of the substrate 401, and the signal collection line 4021 is disposed in the line slot. Thus, by disposing the signal collection line 4021 in the line slot, the line slot has a function of protecting the signal collection line 4021, thus improving the reliability of the signal collection assembly 400.

Specifically, there is no special limitation to a forming manner of the signal collection line 4021 in the line slot. In an embodiment of the present disclosure, the signal collection line 4021 is formed by a conductive metal sheet fixed in the line slot or a conductive metal coating in the line slot. In another embodiment of the present disclosure, the signal collection line 4021 is formed by etching a conductive metal foil in the line slot. A structure of the signal collection line 4021 in the line slot is similar to that of the signal collection line 4021 on the substrate 401, and thus is omitted herein.

A structure of the signal collection member 402 may be reasonably selected according to a kind of data or signal to be collected. In an embodiment of the present disclosure, the signal collection member 402 includes at least one of a temperature sensing element, a humidity sensing element, a pressure sensing element, a concentration sensing element, and a voltage sensing element. In other words, the signal collection member 402 according to embodiments of the present disclosure may be one of the temperature sensing element, the humidity sensing element, the pressure sensing element, the concentration sensing element, the voltage sensing element or a combination thereof. The signal collection member 402 can be reasonably selected according to the actual condition.

In use, the signal collection member 402 is just required to be fixed on the substrate 401 and to be coupled with the signal collection line 4021 so as to connect the signal collection assembly 400 with the power battery. Thus, the signal collection member 402 can be used to collect a temperature, a battery air pressure, an electrolyte concentration and a humidity without adding a new component in the signal collection assembly 400, such that the signal collection assembly 400 is convenient to use and the related data of the power battery is collected efficiently, and an accuracy of a data collection of the signal collection assembly 400 can be ensured.

The signal collection terminal 403 is configured to collect a signal of the power battery module 1000. In some embodiments of the present disclosure, the signal collection terminal 403 is formed by a metal sheet. Specifically, the signal collection terminal 403 is made of aluminum, nickel, copper, or an alloy thereof. In some embodiments of the present disclosure, the signal collection assembly includes a plurality of the signal collection terminals 403, and the plurality of the signal collection terminals 403 are arranged and spaced apart from one another on the substrate 401.

In some embodiments of the present disclosure, a first end of the signal collection terminal 403 is connected with the signal collection line 4021 and a second end of the signal collection terminal 403 is connected with the power connection member 430 or a post of the battery 101 so as to collect the signal of the power battery module 1000. The number and arrangement manner of the signal collection terminals 403 may be reasonably regulated according to the service condition and arrangement manner of the batteries 101 of the power battery module 1000. The signal collection line 4021 on the substrate 401 is connected with the signal collection terminal 403 so as to collect the signal accordingly. The signal collection terminal 403 may be formed by etching itself In some embodiments of the present disclosure, the second end of the signal collection terminal 403 extends beyond the substrate 401, and a part of the signal collection terminal 403 on the substrate 401 is formed by etching. Thus, the signal collection terminal 403 may be connected with the substrate 401 well, and an effect of signal transmission could be ensured.

In some embodiments of the present disclosure, the signal collection assembly 400 further includes a protection component 406 disposed on the substrate 401 and connected with the signal collection line 4021. In embodiments of the present disclosure, the protection component 406 may be formed by a fuse or a circuit configuration according to actual using conditions. The protection component 406 is configured to provide an overcurrent protection for the battery so as to improve safety performance of the whole signal collection assembly 400.

Specifically, in some embodiments of the present disclosure, the protection component 406 includes a chip fuse connected with the signal collection line 4021 via tin soldering, and the number of the protection components 406 may be reasonably regulated according to the number of the batteries 101. The protection component 406 has a wide source and may be connected with a flexible circuit layer of the signal collection line 4021 easily, and it is easy to assemble the protection component 406 to provide a protection for the whole power battery module 1000.

Furthermore, in an embodiment of the present disclosure, the signal collection assembly 400 further includes a protection film 405 disposed on the substrate 401 for covering the signal collection line 4021, the signal collection terminal 403 and the signal collection member 402. Specifically, the protection film 405 according to embodiments of the present disclosure can integrate the signal collection line 4021, the signal collection terminal 403 and the signal collection member 402 on the substrate 401. The protection film 405 has a pressure resistance, an insulation property and an abrasive resistance and can improve a structure sealing property of the signal collection assembly 400. Moreover, the protection film 405 has a function of protecting the signal collection member 402 and the signal collection line 4021, such that the safety and reliability of the signal collection assembly 400 can be ensured.

In some embodiments of the present disclosure, the signal collection assembly 400 and the signal collection line 4021 are configured as a FPC board, and the signal collection line 4021 are formed on the FPC board by etching. In an embodiment of the present disclosure, the FPC board includes a conductive metal foil and a protective film (not shown) covering two sides of the conductive metal foil. The protective film is formed by the substrate 401. The signal collection line 4021 is formed by etching the conductive metal foil. Furthermore, a protection film 405 is disposed on the protective film at a side of the conductive metal foil.

The signal collection assembly 400 according to the embodiment of the present disclosure further includes a connector 404 coupled with the second end of the signal collection line 4021. Specifically, the connector 404 is disposed on the substrate 401. Furthermore, the connector 404 is disposed at an edge of the substrate 404 and the second end of the signal collection line 4021 extends to the edge of the substrate 401. The structure and arrangement of the connector 404 in this embodiment are similar to those of the connector 404 in above embodiments of the present disclosure, and thus are omitted herein.

Figure 2:
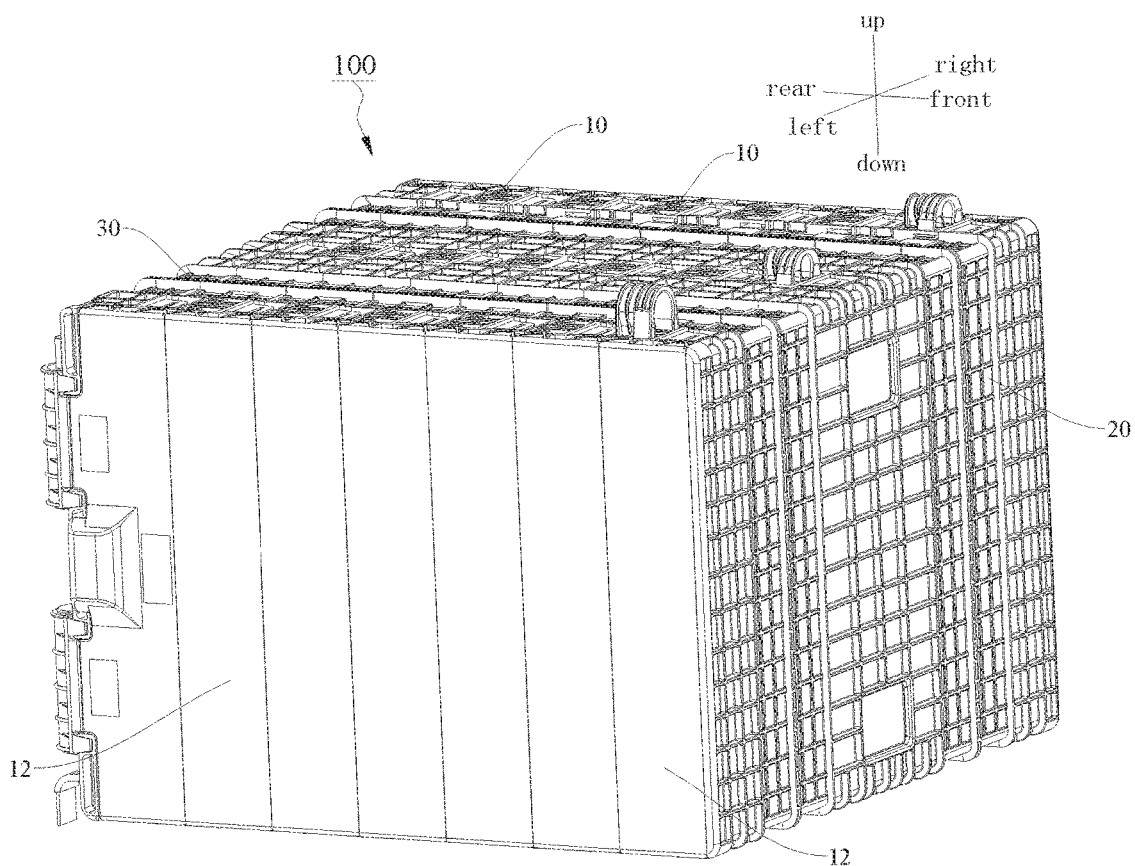
FIG. 2 is a schematic view of the power battery module shown in FIG. 1 from another direction.
Figure 3:
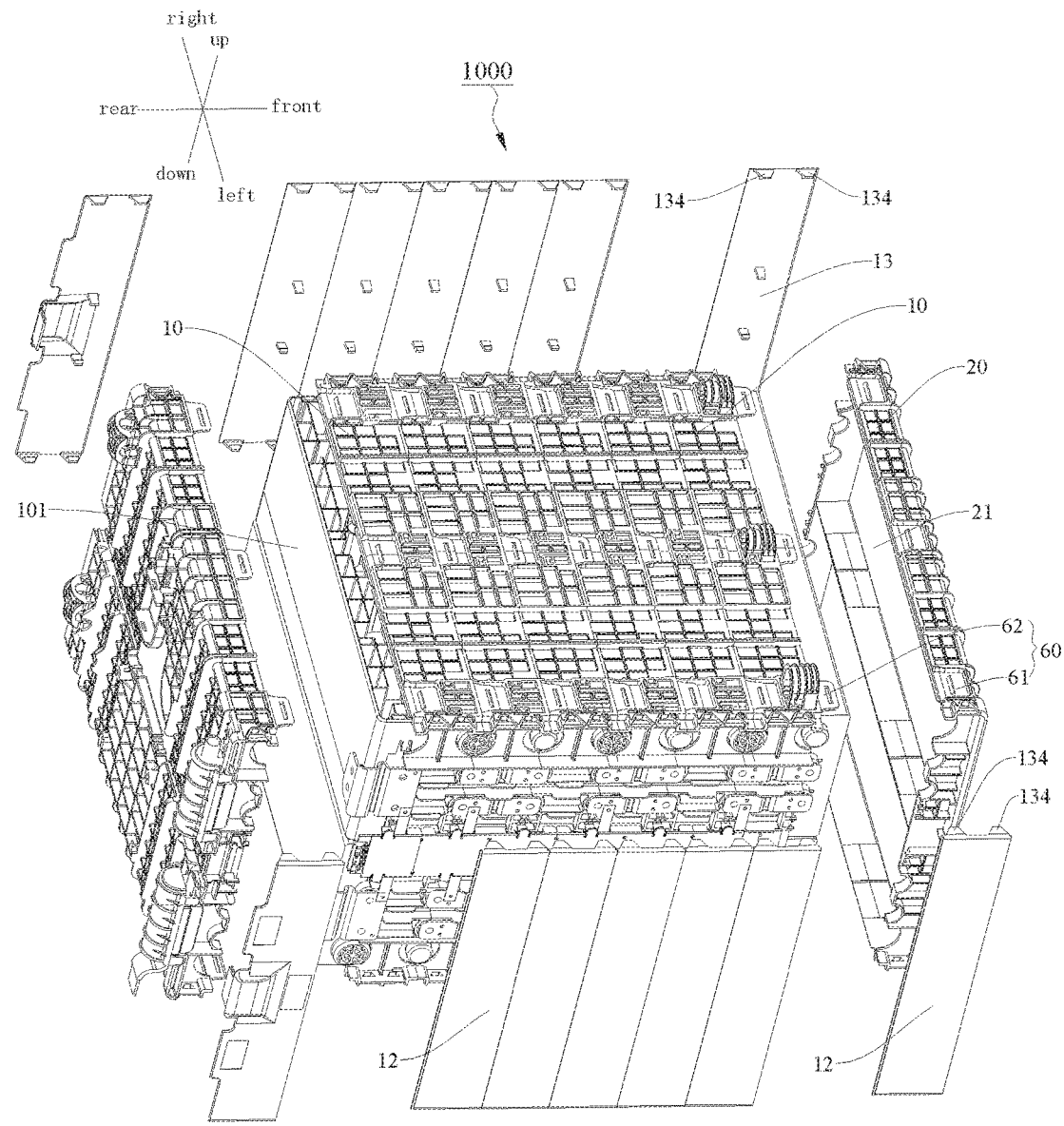
FIG. 3 is a schematic view showing an assembling relationship between a battery accommodating assembly and a battery of the power battery module shown in FIG. 1.

The power connection member 430 may be any common power connection member known to those skilled in the art. For example, in one embodiment of the present disclosure, as shown in FIG. 2, the power connection member 430 is configured as a metal connection sheet having an arch shape, two ends of the metal connection sheet are connected with the electrode terminals 411 of two adjacent batteries 101.

There is no special limitation to a connection manner between the power connection member 430 and the battery 101, for example, the connection manner may be a welding or screw fastening. In an embodiment of the present disclosure, the power connection member 430 is welded with the electrode terminal 411. In another embodiment of the present disclosure, a mounting hole is formed in the signal collection assembly 400, and a positioning member (not shown) is disposed on the battery group. The signal collection assembly 400 is pre-positioned onto the battery group by a connection between the mounting hole and the positioning member. Therefore, the signal collection assembly 400 may be connected with the battery group in different manners, i.e. the connection manner between the power connection member 430 and the battery group is various, thus providing a high adaptability.

There is no special limitation to the connection manner between respective batteries 101. In an embodiment of the present disclosure, the plurality of batteries 101 are connected with each other via a series connection, a parallel connection or a series-parallel connection, and the connection manner thereof may be an impulse welding, a laser beam welding or a mechanical connection.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A power battery module, comprising:
a battery accommodating assembly having a plurality of separators, each separator comprising:
  a separator body having a front portion defining a front accommodating groove and a rear portion;
  a left cover disposed at a left end of the separator body; and
  a right cover disposed at a right end of the separator body,
  wherein adjacent separators are detachably connected with each other, the front accommodating groove of one of the adjacent separators and the rear portion of the separator body of the other of the adjacent separators define a battery chamber, and a snapping hole is formed in at least one of upper and lower walls of the front accommodating groove;
a battery group comprising a plurality of batteries which are accommodated in the battery chambers correspondingly, each battery having an electrode terminal;
a power connection member connected with the electrode terminals of adjacent batteries;
a line snap-fit comprising a snap-fit body defining a line groove penetrating the snap-fit body in a length direction of the snap-fit body, and a snap-fitting portion disposed on an exterior of the snap-fit body and having a line clasp configured to be snapped in the snapping hole to fasten the snap-fit body to the separator;
a power connection line passing through and received in the line groove, and connected with the power connection member; and
a signal collection assembly comprising:
  a substrate;
  a signal collection line formed by a sheet-like conductive element disposed on the substrate;
  a signal collection member disposed on the substrate and connected with the signal collection line; and
  a signal collection terminal disposed on the substrate and including a first end connected with the signal collection line and a second end connected with the power connection member.

2. The power battery module according to claim 1, wherein the adjacent separators are detachably connected with each other via a snapping structure.

3. The power battery module according to claim 1, wherein the rear portion of the separator defines a rear accommodating groove, and the snapping hole is formed in at least one of upper and lower walls of the rear accommodating groove.

4. The power battery module according to claim 1, wherein a front notch is formed in at least one of left and right walls of the front accommodating groove, and a rear notch corresponding to the front notch is formed in at least one of left and right walls of the rear accommodating groove.

5. The power battery module according to claim 4, wherein the separator body comprises:

a vertical plate;
an upper frame plate disposed at a top edge of the vertical plate;
a lower frame plate disposed at a bottom edge of the vertical plate;
a left plate disposed at a left end of the vertical plate and including an upper end connected with the upper frame plate and a lower end connected with the lower frame plate; and
a right plate disposed at a right end of the vertical plate and including an upper end connected with the upper frame plate and a lower end connected with the lower frame plate,
wherein each of the front and rear accommodating grooves is defined by the vertical plate, the upper frame plate, the lower frame plate, the left plate and the right plate.

6. The power battery module according to claim 5, wherein a window is formed in the vertical plate to communicate the front accommodating groove with the rear accommodating groove,
wherein an insertion hole is formed in the upper frame plate, an inserting groove aligned with the inserting hole is formed in the vertical plate, and an insulating plate or a heat conducting plate is inserted into the window via the insertion hole and the inserting groove.

7. The power battery module according to claim 5, wherein a left end of the upper frame plate extends leftward beyond the left plate so as to form a left-upper extending part, a left end of the lower frame plate extends leftward beyond the left plate so as to form a left-lower extending part, a right end of the upper frame plate extends rightward beyond the right plate so as to form a right-upper extending part, and a right end of the lower frame plate extends rightward beyond the right plate so as to form a right-lower extending part, a snapping slot is formed in each of the left-upper extending part, the left-lower extending part, the right-upper extending part and the right-lower extending part; and a left-upper clasp snapped in the snapping slot of the left-upper extending part and a left-lower clasp snapped in the snapping slot of the left-lower extending part are disposed on a right surface of the left cover, and a right-upper clasp snapped in the snapping slot of the right-upper extending part and a right-lower clasp snapped in the snapping slot of the right-lower extending part are disposed on a left surface of the right cover.

8. The power battery module according to claim 5, wherein the left and right covers have a width in a front-rear direction larger than or equal to a width of the left and right plates in the front-rear direction, and less than or equal to a width of the upper and lower frame plates in the front-rear direction.

9. The power battery module according to claim 1, wherein a cover insertion slot is formed in the separator body and a cover clasp adapted to snap in the cover insertion slot is disposed on each of the left and right covers.

10. The power battery module according to claim 1, wherein the snap-fit groove has an opening, and the openings of the snap-fit grooves in the adjacent separators are opposed to each other to receive the connection bridge.

11. The power battery module according to claim 1, wherein the signal collection assembly further comprises a connector connected with the signal collection line and located at an edge of the substrate.

12. The power battery module according to claim 1, wherein the substrate is a flexible board, the signal collection line is formed by a conductive metal sheet fixed on the substrate, or the signal collection line is formed by a conductive metal layer formed on the substrate.

13. The power battery module according to claim 1, wherein the substrate is a flexible board, and the signal collection line is formed by etching a conductive metal foil on the substrate.

14. The power battery module according to claim 1, wherein the substrate is a flexible board, and defines a line slot formed in a surface thereof, and the signal collection line is disposed in the line slot.

15. The power battery module according to claim 14, wherein the signal collection line is formed by a conductive metal sheet fixed in the line slot or a conductive metal coating in the line slot, or the signal collection line is formed by etching a conductive metal foil in the line slot.

16. The power battery module according to claim 1, wherein the signal collection member comprises at least one of a temperature sensing element, a humidity sensing element, a pressure sensing element, a concentration sensing element, and a voltage sensing element.

17. The power battery module according to claim 1, wherein the signal collection terminal is formed by a metal sheet, the signal collection assembly further comprises a protection component disposed on the substrate and connected with the signal collection line, the protection component includes a chip fuse connected with the signal collection line via tin soldering.

18. The power battery module according to claim 1, wherein the signal collection assembly further comprises a protection film disposed on the substrate for covering the signal collection line, the signal collection terminal, and the signal collection member.

19. The power battery module according to claim 1, wherein the substrate and the signal collection line are configured as a FPC board, and the FPC board comprises a conductive metal foil and a protective film covering two sides of the conductive metal foil and formed by a part of the substrate, the signal collection line is formed on the substrate by etching the conductive metal foil.

20. The power battery module according to claim 19, wherein the signal collection assembly further comprises a protection film on the protective film at a side of the conductive metal foil.

\* \* \* \* \*